United States Patent
Hebrink et al.

(10) Patent No.: US 11,634,613 B2
(45) Date of Patent: Apr. 25, 2023

(54) COMPOSITE COOLING FILM COMPRISING AN ORGANIC POLYMERIC LAYER, A UV-ABSORBING LAYER, AND A REFLECTIVE METAL LAYER

(71) Applicant: 3M INNOVATIVE PROPERTIES COMPANY, St. Paul, MN (US)

(72) Inventors: Timothy J. Hebrink, Scandia, MN (US); Michelle M. S. Mok, St. PAul, MN (US); Vivian W. Jones, Woodbury, MN (US); Milind B. Sabade, Woodbury, MN (US); James P. Burke, St. Paul, MN (US); James A. Phipps, River Falls, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/783,843

(22) PCT Filed: Dec. 15, 2020

(86) PCT No.: PCT/IB2020/061989
§ 371 (c)(1),
(2) Date: Jun. 9, 2022

(87) PCT Pub. No.: WO2021/124121
PCT Pub. Date: Jun. 24, 2021

(65) Prior Publication Data
US 2023/0011414 A1 Jan. 12, 2023

Related U.S. Application Data

(60) Provisional application No. 62/950,822, filed on Dec. 19, 2019.

(51) Int. Cl.
*C09J 7/29* (2018.01)
*C09K 5/14* (2006.01)
(Continued)

(52) U.S. Cl.
CPC .. *C09J 7/29* (2018.01); *C09J 7/38* (2018.01); *C09K 5/14* (2013.01); *F25B 23/003* (2013.01);
(Continued)

(58) Field of Classification Search
CPC . C09J 7/29; C09J 7/38; C09J 2301/302; C09J 2400/123; C09J 2400/163;
(Continued)

(56) References Cited

U.S. PATENT DOCUMENTS 4,726,989 A   2/1988  Mrozinski
4,874,567 A   10/1989 Lopatin et al.
(Continued)

FOREIGN PATENT DOCUMENTS

EP   3392037 A1   10/2018
JP   10130596 A   5/1998
(Continued)

OTHER PUBLICATIONS

Gentle, "A Subambient Open Roof Surface on the Mid-Summer Sun", Advanced Science, Sep. 2015, vol. 2, No. 9, 4 pages.
(Continued)

*Primary Examiner* — Nathan L Van Sell

(57) ABSTRACT

A composite cooling film including non-fluorinated organic polymeric layer, a metal layer disposed inwardly of the non-fluorinated organic polymeric layer, and an antisoiling, ultraviolet-absorbing hardcoat layer that is disposed outwardly of the non-fluorinated organic polymeric layer.

26 Claims, 9 Drawing Sheets

(51) Int. Cl.
  *C09J 7/38* (2018.01)
  *F25B 23/00* (2006.01)
  *G02B 5/08* (2006.01)
  *G02B 5/20* (2006.01)

(52) U.S. Cl.
  CPC ........... *G02B 5/0808* (2013.01); *G02B 5/208* (2013.01); *C09J 2301/302* (2020.08); *C09J 2400/123* (2013.01); *C09J 2400/163* (2013.01); *C09J 2433/00* (2013.01)

(58) Field of Classification Search
  CPC ...... C09J 2433/00; C09K 5/14; F25B 23/003; G02B 5/0808; G02B 5/208
  See application file for complete search history.

(56) References Cited

U.S. PATENT DOCUMENTS

| | | | |
|---|---|---|---|
| 4,976,859 | A | 12/1990 | Wechs |
| 5,238,623 | A | 8/1993 | Mrozinski |
| 5,972,453 | A | 10/1999 | Akiwa et al. |
| 5,993,954 | A | 11/1999 | Radovanovic et al. |
| 6,261,994 | B1 | 7/2001 | Bourdelais et al. |
| 6,265,029 | B1 | 7/2001 | Lewis |
| 6,277,485 | B1 | 8/2001 | Invie et al. |
| 6,368,742 | B2 | 4/2002 | Fisher et al. |
| 6,632,850 | B2 | 10/2003 | Hughes et al. |
| 6,991,826 | B2 | 1/2006 | Pellerite et al. |
| 7,328,638 | B2 | 2/2008 | Gardiner et al. |
| 7,350,442 | B2 | 4/2008 | Ehnes et al. |
| 9,523,516 | B2 | 12/2016 | Hebrink et al. |
| 9,568,653 | B2 | 2/2017 | O'Neill et al. |
| 9,614,113 | B2 | 4/2017 | Weigel et al. |
| 9,670,300 | B2 | 6/2017 | Olson et al. |
| 9,939,557 | B2 | 4/2018 | David et al. |
| 10,038,112 | B2 | 7/2018 | Weigel et al. |
| 10,072,173 | B2 | 9/2018 | Clear et al. |
| 10,125,251 | B2 | 11/2018 | Olson et al. |
| 10,134,566 | B2 | 11/2018 | David et al. |
| 10,323,151 | B2 | 6/2019 | Van Overmeere et al. |
| 10,400,354 | B2 | 9/2019 | Zillig et al. |
| 2004/0009410 | A1 | 1/2004 | Lercel et al. |
| 2009/0147361 | A1 | 6/2009 | Gardiner et al. |
| 2013/0236697 | A1 | 9/2013 | Walker, Jr. et al. |
| 2014/0131023 | A1 | 5/2014 | Raman et al. |
| 2014/0349096 | A1 | 11/2014 | Miyazaki et al. |
| 2015/0131146 | A1 | 5/2015 | Fan et al. |
| 2015/0175479 | A1 | 6/2015 | Brown et al. |
| 2015/0338175 | A1 | 11/2015 | Raman et al. |
| 2016/0268464 | A1 | 9/2016 | Fan et al. |
| 2019/0111666 | A1 | 4/2019 | Hebrink et al. |
| 2019/0152410 | A1 | 5/2019 | Zhu et al. |

FOREIGN PATENT DOCUMENTS

| | | |
|---|---|---|
| WO | 1995016754 A1 | 6/1995 |
| WO | 2000048037 A2 | 8/2000 |
| WO | 2002012404 A2 | 2/2002 |
| WO | 2007087281 A1 | 8/2007 |
| WO | 2017172564 A2 | 10/2017 |
| WO | 2018130926 A1 | 7/2018 |
| WO | 2019130198 A1 | 7/2019 |
| WO | 2019130199 A1 | 7/2019 |
| WO | 2020240366 A1 | 12/2020 |
| WO | 2020240447 A1 | 12/2020 |

OTHER PUBLICATIONS

Hossain, "A Metamaterial Emitter for Highly Efficient Radiative Cooling", Advanced Optical Materials, 2015, vol. 3, No. 8, pp. 1047-1051.

Hossain, "Radiative Cooling: Principles, Progress, and Potentials", Advanced Science, 2016, vol. 3, No. 7, 10 pages.

International Search Report for PCT Application No. PCT/IB2020/061989 dated Mar. 11, 2021, 3 pages.

Raman, "Passive Radiative Cooling below ambient air temperature under direct sunlight", Nature, Nov. 27, 2014, vol. 515, No. 7528, pp. 540-544.

Satas, "Handbook of Pressure Sensitive Adhesive Technology", 172 (1989).

Zhai, "Scalable-manufactured randomized glass-polymer hybrid metamaterial for daytime radiative cooling", Science, Mar. 10, 2017, vol. 355, No. 6329, pp. 1062-1066.

COMPOSITE COOLING FILM COMPRISING AN ORGANIC POLYMERIC LAYER, A UV-ABSORBING LAYER, AND A REFLECTIVE METAL LAYER

CROSS REFERENCE TO RELATED APPLICATIONS

This application is a national stage filing under 35 U.S.C. 371 of PCT/IB2020/061989, filed 15 Dec. 2020, which claims the benefit of U.S. Provisional Patent Application No. 62/950,822, filed 19 Dec. 2019, the disclosure of which is incorporated by reference in its/their entirety herein.

BACKGROUND

Entities such as e.g. vehicles and buildings, transformers, and so on are often equipped with active cooling systems in order to remove thermal energy acquired by the impingement of solar radiation on the entity, to remove thermal energy generated internally by the entity itself, and so on.

SUMMARY

In broad summary, herein is disclosed a passive radiative composite cooling film suitable for use in passively cooling a substrate (which substrate may be attached to, and/or a part of, an entity such as a vehicle or building). In broad summary, a composite cooling film comprises a non-fluorinated organic polymeric layer; a metal layer disposed inwardly of the non-fluorinated organic polymeric layer; and, an antisoiling layer. The antisoiling layer is disposed outwardly of the non-fluorinated organic polymeric layer and comprises an outwardly-facing, exposed antisoiling surface. The antisoiling layer is an ultraviolet-absorbing layer. The composite cooling film may exhibit an average absorbance over the wavelength range 8-13 microns of at least 0.85; in some embodiments, the composite cooling film may exhibit such an absorbance over the wavelength range of 4-20 microns.

These and other aspects will be apparent from the detailed description below. In no event, however, should this broad summary be construed to limit the claimable subject matter, whether such subject matter is presented in claims in the application as initially filed or in claims that are amended or otherwise presented in prosecution.

BRIEF DESCRIPTION OF THE DRAWINGS

FIG. 4A shows a perspective view of a cross section relative to xyz-axes. FIG. 4C shows the cross section of FIG. 4A in an xz-plane. FIG. 4B shows another cross section in a yz-plane.

Figure 1:
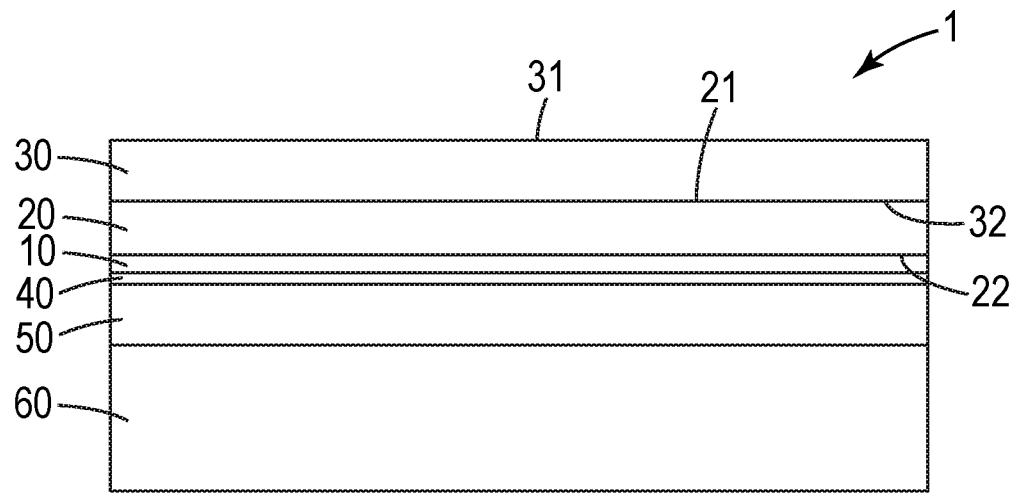
FIG. 1 is a schematic side view of an exemplary composite cooling film bonded to a substrate that is secured to an entity to be cooled.

Unless otherwise indicated, all figures and drawings are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DETAILED DESCRIPTION

As used herein:

"fluoropolymer" refers to any organic polymer containing fluorine;

"infrared" (IR) refers to infrared electromagnetic radiation having a wavelength of >700 nm to 1 mm, unless otherwise indicated;

"visible" (VIS) refers to visible electromagnetic radiation having a wavelength to from 400 nm to 700 nm, inclusive, unless otherwise indicated;

"ultraviolet" (UV) refers to ultraviolet electromagnetic radiation having a wavelength of at least 250 nm and up to but not including 400 nm, unless otherwise indicated;

"microporous" means having internal porosity (continuous and/or discontinuous) having average pore diameters of 50 to 10,000 nm;

"micro-voided" means having internal discrete voids having an average void diameter of 50 to 10,000 nm;

"nonfluorinated" mean not containing fluorine;

"radiation" means electromagnetic radiation unless otherwise specified;

"average reflectance" means reflectance averaged over a specified wavelength range;

"reflective" and "reflectivity" refer to the property of reflecting light or radiation, especially reflectance as measured independently of the thickness of a material; and "reflectance" is the measure of the proportion of light or other radiation striking a surface at normal incidence which is reflected off it. Reflectivity typically varies with wavelength and is reported as the percent of incident light that is reflected from a surface (0 percent—no reflected light, 100—all light reflected; often, such reflectivity is normalized to a 0-1 scale). Reflectivity, and reflectance are used interchangeably herein. Reflectance can be measured according to methods disclosed later herein.

Absorbance can be measured with methods described in ASTM E903-12 "Standard Test Method for Solar Absorptance, Reflectance, and Transmittance of Materials Using Integrating Spheres". Absorbance values can be obtained by making transmittance measurements and then calculating absorbance using Equation 1, hereinbelow.

As used herein, the term "absorbance" refers to the base 10 logarithm of a ratio of incident radiant power to transmitted radiant power through a material. The ratio may be described as the radiant flux received by the material divided by the radiant flux transmitted by the material. Absorbance (A) may be calculated based on transmittance (T) according to Equation 1:

$$A = -\log_{10} T \quad (1)$$

Emissivity can be measured using infrared imaging radiometers with methods described in ASTM E1933-14 (2018) "Standard Practice for Measuring and Compensating for Emissivity Using Infrared Imaging Radiometers."

Terms such as outward, inward, and similar terms, are used with reference to a composite cooling film when secured to a substrate. Outward denotes a direction away from the substrate and inward denotes a direction toward the substrate. An antisoiling layer of the cooling film will typically be the outwardmost surface of the cooling film; in many embodiments, an inwardmost layer of the cooling film may be a layer of adhesive that allows the cooling film to be secured to the substrate. Inward (I) and outward (O) directions are indicated in various figures for clarity. It will be understood that this terminology is used for ease of description and does not limit the actual orientation at which the cooling film may be positioned during actual use (e.g. horizontal, angled so as to face the sun, etc.).

"Disposed atop", "disposed on", "secured to", and like terms, encompass arrangements in which an item is directly or indirectly affixed to (e.g., in direct contact with, or adhesively bonded to by a unitary layer of adhesive) another item. That is, such terms allow the existence of an intervening (e.g. bonding) layer.

A "composite" film comprises multiple layers (any of which may comprise sublayers) and requires that all such layers and/or sublayers are affixed (e.g. bonded) to each other (e.g. by way of pressure-sensitive adhesion, by being melt-bonded to each other, or any like methods) rather than being e.g. abutted against each other and held in place by mechanical means.

Composite Cooling Film

As illustrated in generic, illustrative representation in FIG. 1, disclosed herein is a composite cooling film 1 comprising an antisoiling layer 30 of organic polymeric material. Antisoiling layer 30 is a hardcoat layer as discussed in detail later herein, comprising a first, outwardly-facing, exposed antisoiling surface 31 and a second, inwardly-facing opposing surface 32. Cooling film 1 further comprises a non-fluorinated organic polymeric layer 20 which serves to emit radiation in at least selected wavelengths as discussed herein and will occasionally be referred to herein as an absorptive/emissive layer. Accordingly, layer 20 may thus exhibit an absorbance of at least 0.5, 0.6, 0.7, 0.8, 0.9, or 0.95 in a wavelength range at least covering the range of from 8 to 13 microns. Cooling film 1 further comprises a metal layer 10 that is disposed inwardly of absorptive/emissive layer 20. In some embodiments (e.g. in which layer 20 is significantly reflective in certain wavelengths in addition to being absorptive/emissive in particular wavelengths) metal layer 10 may serve primarily to further enhance the reflectivity exhibited by layer 20. In other embodiments (e.g. in which layer 20 is e.g. substantially non-reflective in certain wavelengths) metal layer 10 may provide a significant fraction, e.g. essentially all, of the reflectivity exhibited by cooling film 1 (over the wavelength range of interest).

Figure 2:
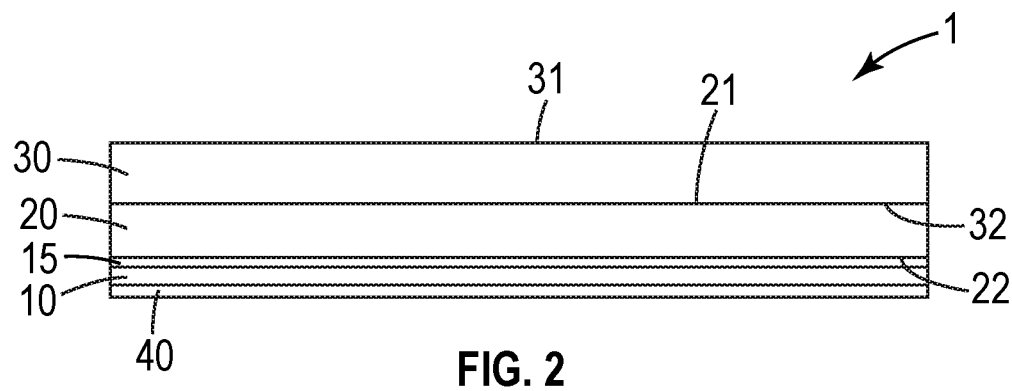
FIG. 2 is a schematic side view of another exemplary composite cooling film.
Figure 3:
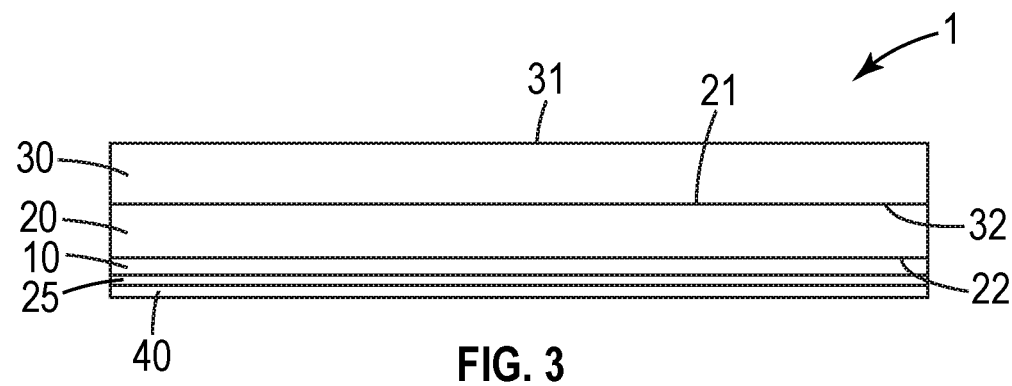
FIG. 3 is a schematic side view of another exemplary composite cooling film.

In some embodiments reflective metal layer 10 may be disposed directly onto major rearward surface 22 of absorptive/emissive layer 20 (e.g. by vapor-coating), as in the exemplary arrangement of FIG. 1. In some embodiments an intervening layer 15 may be present on surface 22 with metal layer 10 disposed thereon (e.g. by vapor coating) and affixed thereto, as in the exemplary arrangement of FIG. 2. Such a layer 15 may promote or enhance the ability of metal layer 10 to bond to surface 22 of layer 20 and will be referred to herein as a tie layer. In some embodiments, an anticorrosion layer 25 may be disposed rearward of metal layer, 10, as in the exemplary arrangement of FIG. 3, e.g. in order to protect metal layer 10 from corrosion.

Antisoiling (hardcoat) layer 30, being the outwardmost layer of cooling film 1, provides physical protection for the other layers and in particular can impart anti-soiling and/or easy-cleaning properties to the outermost surface 31 of cooling film 1. However, in some embodiments layer 30 may also contribute at least somewhat to the passive cooling that is achieved by cooling film 1. In some embodiments, antisoiling layer 30 may exhibit enhanced resistance to being soiled, and/or may be easily cleaned, by virtue of the chemical composition of at least the exposed surface 31 of the antisoiling layer. In some embodiments the chemical composition of exposed surface 31 may be the same as the bulk composition of layer 30. In some embodiments surface 31 may be treated in a manner that specifically alters its chemical composition to provide enhanced antisoiling.

In some embodiments, exposed surface 31 of antisoiling layer 30 may be provided with a texture or topography that provides enhanced antisoiling. Such a texture may, for example, take the form of a set of microstructures and/or nanostructures. In brief, such texture may be formed e.g. by molding, embossing, or otherwise forming or pressing layer 30 against a textured tooling surface to impart the desired texture to surface 31; by removing material from surface 31 (e.g. by etching, laser ablation, etc.) to impart the desired texture; and/or, by including particulate materials (e.g. glass microspheres or the like) in layer 30 to impart the desired texture. Combinations of these approaches can be used if desired. Such approaches are discussed in detail later herein.

As disclosed herein, antisoiling (hardcoat) layer 30 also serves as a UV-absorbing layer. That is, in such embodiments layer 30 is configured to serve both as an antisoiling layer and as a UV-absorbing layer, as discussed in detail later herein. Also as discussed later herein, antisoiling layer 30 is a hardcoat layer that is loaded with UV-blocking additive. In some embodiments, antisoiling layer 30 may be directly affixed to absorptive/emissive layer 20, as in the exemplary arrangement of FIG. 1. For example, a hardcoat precursor (e.g. a coating composition) may be disposed onto outward major surface 21 of layer 20 by any suitable coating method, after which the precursor is solidified (again by any suitable method) to form antisoiling, UV-absorbing hardcoat 30.

In some embodiments, cooling film 1 may comprise a layer of adhesive (e.g. a pressure-sensitive adhesive) 40 which may be used to bond cooling film 1 to a substrate 50 as indicated in FIG. 1. Substrate 50 may in turn be bonded, secured or otherwise in thermal contact with a portion of an entity 60 (e.g., a vehicle or a building) that is to be passively cooled, as indicated in exemplary embodiment in FIG. 1.

Cooling film 1 may provide passive cooling in the general manner discussed in detail in U.S. Provisional Patent Application Nos. 62/855,392 and 62/855,407, both of which are incorporated by reference in their entirety herein. Organic polymeric layer 20 may have a composition that emits thermal radiation in a range in which the Earth's atmosphere is relatively transparent (i.e., the atmospheric "window" of approximately 8 to 13 μm wavelength), as discussed in detail in the above-cited U.S. Provisional Patent Application No. 62/855,392, to perform passive cooling. As noted, metal layer 10 will provide reflectivity as needed, and hardcoat layer 30 will provide physical protection and protection from UV radiation.

Organic Polymeric Absorptive/Emissive Layer

As mentioned above, cooling film 1 comprises a non-fluorinated organic polymeric layer 20 with an outward major surface 21 (which may, in some embodiments, be in direct contact with an inward major surface 32 of antisoiling layer 30) and an inward major surface 22 (which may, in some embodiments, be in direct contact with metal layer 10). Layer 20 serves as an absorbtive/emissive layer and will exhibit an absorbance of at least 0.5, 0.6, 0.7 0.8, or 0.9 in a wavelength range of from 8 to 13 microns.

In various embodiments, layer 20 may range from e.g. a nonporous (dense) film, meaning a film with a porosity of less than 2%, to an extremely porous (e.g. microporous) structure, e.g. exhibiting a porosity of at least 70, 80, 90, or 95%. In some embodiments, layer 20 may exhibit a structure that is intermediate between these two extremes, e.g. layer 20 may be a material that is somewhat porous (e.g. with a porosity of from greater than 2, 5, 10 or 20%, up to 40, 50, 60 or 70%). The geometric structure of layer 20 (and porosity, specifically) of layer 20 is not particularly limited as long as layer 20 comprises sufficient organic polymeric material, of suitable composition, to provide the desired absorbance/emissivity.

Similarly, the reflectance of layer 20 may vary. In some embodiments, layer 20 may be very reflective, e.g. it may take the form of a micro-voided organic polymeric material (e.g. PET) of the general type described later herein. In such cases, layer 20 may exhibit an average reflectance of electromagnetic radiation of e.g. at least 85% over a wavelength range from 400 to 2500 nanometers. In such cases, the role of the later-described metal layer 10 may only be to augment this reflectivity slightly. In other embodiments, layer 20 may be substantially non-reflective, e.g. it may take the form of a highly-transmissive (and non-porous) organic polymeric film such as the product available from DuPont-Teijin under the trade designation MYLAR D. In such cases, layer 20 may exhibit a relatively low reflectance (e.g., less than 10, 5 or 2%) over this wavelength range, with metal layer 10 thus providing the majority of the reflectance. In between these extremes, may intermediate cases are possible e.g. in which both layer 20 and layer 10 contribute significantly to the reflectance, as discussed later herein. In various embodiments, the reflectance provided by either or both layers, and the overall reflectance exhibited by cooling film 1, may be e.g. diffuse or specular.

As noted, layer 20 is non-fluorinated. As specified herein, this denotes an entity that includes less than 1% by weight of fluorine atoms. In various embodiments, layer 20 may include less than 0.5, 0.1, or 0.01% by weight of fluorine atoms.

In some embodiments, absorptive/emissive layer 20 may be an organic polymeric (e.g. non-fluorinated) material that is porous, e.g. microporous, comprising a network of interconnected voids and/or discrete voids, which may be spherical, oblate, or some other shape. Layer 20 may thus be reflective owing at least in part to the presence of the voids. Such a reflective microporous layer may have voids that are of appropriate size that they diffusely reflect wavelengths in the 400 to 2500 nm wavelength range. Generally, this means that the void sizes should be in a size range of e.g. 100 to 3000, or even 5000, nm. Preferably, a range of void sizes corresponding to those dimensions is present so that effective broadband reflection will be achieved. As used herein the term "polymer" includes synthetic and natural organic polymers (e.g., cellulose and its derivatives).

Reflectivity of the reflective microporous layer is generally a function of the number of polymer film/void interfaces, since reflection (typically diffuse reflection) occurs at those locations. Accordingly, the porosity and thickness of the reflective microporous layer will be important variable. In general, higher porosity and higher total thickness of the microporous layer correlate with higher reflectivity. However, for cost considerations film thickness is preferably minimized, although this is not a requirement. Accordingly, the thickness of the reflective microporous layer is typically in the range of 10 microns to 500 microns, preferably in the range of 10 microns to 200 microns, although this is not a requirement. Likewise, the porosity of the reflective microporous layer is typically in the range of 10 volume percent to 90 volume percent, preferably in the range of 20 volume percent to 85 volume percent, although this is not a requirement.

Microporous polymer films suitable for use as a reflective microporous layer are known in the art and are described, for example, in U.S. Pat. No. 4,874,567 (Lopatin et al.) entitled "Microporous Membranes from Polypropylene". These films may have average pore diameters of at least 0.05 microns. In certain embodiments, the reflective microporous layer includes at least one Thermally Induced Phase Separation (TIPS) material. The pore size of TIPS materials can be generally controlled due to the ability to select the extent of stretching of the layer. TIPS materials are relatively inexpensive to make, and methods for making them are known to the skilled practitioner. For example, various materials and methods are described in detail in U.S. Pat. No. 4,726,989 (Mrozinski), U.S. Pat. No. 5,238,623 (Mrozinski), 5,993,954 (Radovanovic et al.), and 6,632,850 (Hughes et al.). reflective microporous layers for use in aspects of the present disclosure also include Solvent Induced Phase Separated (SIPS) materials (e.g., U.S. Pat. No. 4,976,859 (Wechs)) and other reflective microporous layers made by extrusion, extrusion/stretching and extrusion/stretching/extraction processes. Suitable reflective microporous layers that may be formed by SIPS include for example and without limitation, polyether sulfone (PES), polysulfone (PS), polyacrylonitrile (PAN), nylon (i.e., polyamide), cellulose acetate, cellulose nitrate, regenerated cellulose, and polyimide. Suitable reflective microporous layers that may be formed by stretching techniques (e.g., U.S. Pat. No. 6,368,742 (Fisher et al.)) include for example and without limitation, and polypropylene.

In certain embodiments, the reflective microporous layer comprises a thermoplastic polymer, for example polypropylene, 1-octene, styrene, polyolefin copolymer, polyamide, poly-1-butene, poly-4-methyl-1-pentene, polyethersulfone, polysulfone, polyacrylonitrile, polyamide, cellulosic polymers and polysaccharides, cellulose acetate, cellulose nitrate, regenerated cellulose, polyvinyl chloride, polycarbonate, polyethylene terephthalate, polyimide, or combinations thereof. In some embodiments, the reflective microporous layer may be a so-called bioplastic (e.g. a biopolyester) material and/or may be biodegradable. In some embodiments, the layer may comprise polylactic acid.

Materials suitable for use as the reflective microporous layer include nonwoven fibrous layers.

Polymeric nonwoven layers can be made using a melt blowing process. Melt blown nonwoven fibrous layers can contain very fine fibers. In melt-blowing, one or more thermoplastic polymer streams are extruded through a die containing closely arranged orifices. These polymer streams are attenuated by convergent streams of hot air at high velocities to form fine fibers, which are then collected on a surface to provide a melt-blown nonwoven fibrous layer. Depending on the operating parameters chosen, the collected fibers may be semi-continuous or essentially discontinuous.

Polymeric nonwoven layers can also be made by a process known as melt spinning In melt spinning, the nonwoven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt-spun fibers are collected as a fibrous web and optionally subjected to one or more bonding operations to fuse the fibers to each other. Melt-spun fibers are generally larger in diameter than melt-blown fibers.

Polymers suitable for use in a melt blown or melt spinning process include polyolefins (e.g. polypropylene), polyester, polyethylene terephthalate, polybutylene terephthalate, polylactic acid, polyamide, polyurethane, polybutene, poly-lactic acid, polyphenylene sulfide, polysulfone, liquid crystalline polymer, polyethylene-co-vinyl acetate, polyacrylonitrile, cyclic polyolefin, and copolymers and blends thereof In some embodiments, the polymer, copolymer, or blend thereof represents at least 35% of the overall weight of the directly formed fibers present in the nonwoven layer.

Nonwoven fibers can be made from a thermoplastic semi-crystalline polymer, such as a semi-crystalline polyester. Useful polyesters include aliphatic polyesters. Nonwoven materials based on aliphatic polyester fibers can be especially advantageous in resisting degradation or shrinkage at high temperature applications. This property can be achieved by making the nonwoven fibrous layer using a melt blowing process where the melt blown fibers are subjected to a controlled in-flight heat treatment operation immediately upon exit of the melt blown fibers from the multiplicity of orifices. The controlled in-flight heat treatment operation takes place at a temperature below a melting temperature of the portion of the melt blown fibers for a time sufficient to achieve stress relaxation of at least a portion of the molecules within the portion of the fibers subjected to the controlled in-flight heat treatment operation. Details of the in-flight heat treatment are described in U.S. Pat. No. 10,400,354 (Zillig et al.).

Nonwoven fibrous layers that may be used for the reflective microporous layer include ones made using an air laid process, in which a wall of air blows fibers onto a perforated collection drum having negative pressure inside the drum. The air is pulled though the drum and the fibers are collected on the outside of the drum where they are removed as a web.

Exemplary embodiments of microporous membrane fabricated with nonwoven fibers are highly reflective white papers comprising polysaccharides. Micro-porous polysaccharide white papers having greater than 90% reflectance over visible wavelengths of 400 to 700 nm are available from International Paper, Memphis, Tenn., under the trade designations IP ACCENT OPAQUE DIGITAL (100 lbs), IP ACCENT OPAQUE DIGITAL (100 lbs), HAMMERMILL PREMIUM COLOR COPY (80 lbs), and HAMMERMILL PREMIUM COLOR COPY (100 lbs). Titania, $BaSO_4$ and other white pigments are often added to paper to increase their reflection of visible light (400-700 nm).

Other nonwoven fibrous layers that may be used for the reflective microporous layer include those made using a wet laid process. A wet laying or "wetlaid" process comprises (a) forming a dispersion comprising one or more types of fibers, optionally a polymeric binder, and optionally a particle filler(s) in at least one dispersing liquid (preferably water); and (b) removing the dispersing liquid from the dispersion.

Suitable fibers for use in air laid and wet laid processes include those made from natural (animal or vegetable) and/or synthetic polymers, including thermoplastic and solvent-dispersible polymers. Useful polymers include wool; silk; cellulosic polymers (e.g., cellulose and cellulose derivatives); chlorinated polymers; polyolefins (e.g., polypropylene, poly-1-butene, copolymers of ethylene and/or propylene, with 0.1-butene, 1-hexene, 1-octene, and/or 1-decene (e.g., poly(ethylene-co-1-butene), poly(ethylene-co-1-butene-co-1-hexene)); polyisoprenes; polybutadienes; polyamides (e.g., nylon 6, nylon 6,6, nylon 6,12, poly (iminoadipoyliminohexamethylene), poly (iminoadipoyliminodecamethylene), or polycaprolactam); polyimides (e.g., poly(pyromellitimide)); polyethers; polyether sulfones (e.g., poly(diphenyl ether sulfone), or poly(diphenyl sulfone-co-diphenylene oxide sulfone)); polysulfones; polyvinyl acetates; copolymers of vinyl acetate (e.g., poly(ethylene-co-vinyl acetate), copolymers in which at least some of the acetate groups have been hydrolyzed to provide various poly(vinyl alcohols) including poly(ethylene-co-vinyl alcohol)); polyphosphazenes; polyvinyl esters; polyvinyl ethers; poly(vinyl alcohols); polyaramids (e.g., para-aramids such as poly(paraphenylene terephthalamide) and fibers sold under the trade designation KEVLAR by DuPont Co., Wilmington, Del., pulps of which are commercially available in various grades based on the length of the fibers that make up the pulp such as, e.g., KEVLAR 1F306 and KEVLAR 1F694, both of which include aramid fibers that are at least 4 mm in length); polycarbonates; and combinations thereof. Nonwoven fibrous layers may be calendered to adjust the pore size.

In some embodiments a reflective microporous layer 20 may take the form of a micro-voided polymer layer (e.g. film); in some instances such a layer may provide a very high reflectance, e.g. even greater than that of a silvered mirror. In some embodiments, a reflective micro-voided polymer film reflects a maximum amount of solar energy in a range from 400 to 2500 nanometers (nm). Further, inorganic particles including barium sulfate, calcium carbonate, silica, alumina, aluminum silicate, zirconia, and titania may be blended into the micro-voided polymer film for providing high solar reflectance in solar radiation spectra of (e.g. 0.4 to 2.5 microns) and high absorbance in the atmospheric window of approximately 8 to 13 microns.

Exemplary polymers useful for forming the reflective micro-voided polymer film include polyethylene terephthalate (PET) available from 3M Company. Modified PET copolyesters including PETG available, for example, as SPECTAR 14471 and EASTAR GN071 from Eastman Chemical Company, Kingsport, Tenn., and PCTG available, for example, as TIGLAZE ST and EB0062 also from Eastman Chemical Company are also useful high refractive index polymers. Polylactic acid may be used. The molecular orientation of e.g. PET and PET modified copolyesters may be increased by stretching which increases its in-plane refractive indices providing more reflectivity. In general, an incompatible polymer additive, or inorganic particle additive, is blended into the PET host polymer at levels of at least 10 wt. %, at least 20 wt. %, at least 30 wt. %, at least 40 wt. %, or even at least 49 wt. % during extrusion prior to stretching to nucleate voids during the stretching process. Suitable incompatible polymeric additives for PET include: polypropylenes, polyethylenes, and other polymers which do not adhere well to PET. Similarly, if polypropylene is the host polymer, then incompatible polymer additives such as PET can be added to the polypropylene host polymer at levels of at least 10 wt. %, at least 20 wt. %, at least 30 wt. %, at least 40 wt. %, or even at least 49 wt. % during extrusion prior to stretching to nucleate voids during the stretching process. Exemplary suitable inorganic particle additives for nucleating voids in micro-voided polymer films include titania, silica, alumina, aluminum silicate, zirconia, calcium carbonate, barium sulfate, and glass beads and hollow glass bubbles, although other inorganic particles and combinations of inorganic particles may also be used. Cross-linked polymeric microspheres can also be used instead of inorganic particles. Inorganic particles can be added to the host polymer at levels of at least 10 wt. %, at least 20 wt. %, at least 30 wt. %, at least 40 wt. %, or even at least 49 wt. % during extrusion prior to stretching to nucleate voids during the stretching process. If present, the inorganic particles preferably have a volume average particle diameter of 5 nm to 1 micron, although other particle sizes may also be used. Hard particles including glass beads and/or glass bubbles can be present. In some embodiments, glass beads and/or glass bubbles may even protrude from the surface as hemispheres or even quarter spheres.

An exemplary micro-voided PET film is available as LUMIRROR XJSA2 from Toray Plastics (America) Inc., North Kingstown, R.I. LUMIRROR XJSA2 comprises one or more inorganic additives to increase its reflectivity of visible light (400-700 nm). Additional exemplary reflective micro-voided polymer films are available from Mitsubishi Polymer Film, Inc., Greer, S.C., as HOSTAPHAN V54B, HOSTAPHAN WDI3, and HOSTAPHAN W270. Exemplary micro-voided polyolefin films are described in, for example, U.S. Pat. No. 6,261,994 (Bourdelais et al.).

In some embodiments, layer 20 may take the form of an organic polymeric film that is nonporous (e.g., dense), meaning that is exhibits a porosity of less than 2% as noted earlier. Such a film may be comprised of any suitable organic polymer, copolymer, blend, polymer alloy, or the like. In various embodiments, layer 20 may comprise for example polypropylene, polystyrene, polyolefin copolymer, polyamide, poly-1-butene, poly-4-methyl-1-pentene, polyethersulfone, polysulfone, polyacrylonitrile, polyamide, cellulosic polymers and polysaccharides, cellulose acetate, cellulose nitrate, regenerated cellulose, polyvinyl chloride, polycarbonate, polyurethane, polyester (e.g. polyethylene terephthalate), polyimide, or combinations thereof. A film of any such material may be e.g. a cast film, an extruded film, an oriented film, and so on.

In some embodiments, a polyester material (e.g. PET, polyethylene naphthalate (PEN), polybutylene terephthalate (PBT), a modified polyester (e.g. PETG), polylactic acid, and blends and copolymers thereof), may be used, in view of the advantageous properties of such materials. In some embodiments, any such material (whether comprised e.g. of polyester, polypropylene, or the like) may be oriented (e.g. biaxially oriented) as noted above, to further enhance the properties of the materials. Thus in some embodiments layer 20 may be chosen from, for example, various biaxially-oriented polyesters available under trade designations such as MYLAR, MELINEX, and HOSTPHAN. Such materials are, in particular, well suited to having a metal layer vapor coated onto a major surface thereof to form a metal layer 10 as described herein.

As noted, a layer 20 may be of an intermediate character e.g. between the extremes of a very porous material (e.g. a nonwoven or a microvoided film) and a dense film. Thus, for example, layer 20 may take the form of e.g. a nonwoven that has been heavily calendered to increase its bulk density and to decrease its porosity. As will be well understood by ordinary artisans, various organic polymeric membranes, films, foams, sheeting, and so on, are available in a range of densities and porosities and may be suitable for use as a layer 20. Again as will be well understood, some such materials may exhibit one or more discontinuous major surfaces (e.g. in the manner of nonwovens) or may exhibit one or more continuous (e.g., skinned) major surfaces. In some embodiments, a discontinuous outward surface 21 may make it easier to e.g. bond a hardcoat layer 30 thereto; however, this is not a requirement. Similarly, a continuous (e.g. skinned) inward surface 22 may make it easier to dispose (e.g. by vapor coating) a metal layer 10 thereon; again, this is not a requirement. That is, in some instances a metal layer may be disposed onto a discontinuous inward surface 22 of a layer 20, as discussed later herein.

The above discussions make it clear that the reflectivity of layer 20 may vary over a wide range. Furthermore, the reflectivity may be e.g. specularly reflective, diffusely reflective, or of some intermediate nature. The reflectivity of layer 20 (or of metal layer 10, or of the combination of layers 20 and 10, or of cooling film 1 as a whole) may be measured in general accordance with the methods and equipment referenced in ASTM E1349-06 (2015). Such methods may make use of an integrating sphere and a spectrophotometer that scans over a desired range (e.g. from 400 nm to 2500 nm) at suitable intervals (e.g. 5 nm) in reflection mode, e.g. as outlined in U.S. Provisional Patent Application No. 62/611,639 and in the resulting International Patent Application Publication WO 2019/130199, both of which are incorporated by reference herein in their entirety. The measurements can then be reported as an average over the wavelength range. In some embodiments, any of the herein-listed values may be an average value obtained by weighting the results over the wavelength range according to the weightings of the AM1.5 standard solar spectrum. This can be performed according to procedures outlined e.g. in ASTM E903.

As noted, in some embodiments layer 20 may be highly reflective. In various embodiments, a reflective microporous (e.g. micro-voided) layer 20 may be diffusely reflective, for example, of visible radiation over a majority of wavelengths in the range of 400 to 700 nanometers, inclusive. In some embodiments, such a layer may have an average reflectance (measured as discussed above) of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 700 nm.

The reflectivity of the reflective microporous layer may be reflective over a broader wavelength range. Accordingly, in some embodiments, the reflectivity of the microporous polymer layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 2.5 micrometers, preferably at least 300 nm to 3.0 micrometers, although this is not a requirement.

As noted, in some embodiments layer 20 may exhibit very low reflectivity. Thus in various embodiments, layer 20 may exhibit a reflectivity of less than 10, 5, 2 or even 1%, over either of the wavelength ranges noted above. In some embodiments, layer 20 may exhibit an intermediate reflectance. Thus in various embodiments, layer 20 may exhibit a reflectance of at least 5, 15, 25, 35, 45, 55, 65 or 75%. In further embodiments, such a layer 20 may exhibit a reflectance that is less than 70, 60, 50, 40, 30, or 20%, over any of these wavelength ranges.

Reflective Metal Layer

Reflective metal layer 10 may comprise any metal that imparts sufficient reflectance when disposed inwardly of absorptive/emissive layer 20. A primary function of the reflective metal layer is to reflect at least a portion of visible and infrared radiation of the solar spectrum; and, in so doing, to work in concert with absorptive/emissive layer 20 to perform passive cooling.

In some embodiments the reflective metal layer 10 may be continuous (uninterrupted) e.g. down to a nanometer scale. For example, layer 10 may be of the general type achieved by conventional vapor coating, sputter coating, etc., of the metal onto surface 22 of layer 20 (or onto a tie layer 15 present thereon). However, no particular deposition method is required; thus in some embodiments a reflective metal layer may take the form of a dispersion of reflective particles (e.g. a silver ink) that is deposited (e.g. by coating, screen-printing, etc.) onto surface 22. In various embodiments, any reflective particles that are present in the dispersion may, as the liquid carrier is removed, aggregate to various degrees. That is, in various embodiments, such reflective particles may or may not coalesce to form a continuous layer. In some embodiments a metal may be applied by electroplating or by wet-solution-reduction methods (e.g. reduction of silver nitrate), in which similar considerations apply.

Regardless of the particular method by which the metal or metals are disposed to form layer 10, the metal(s) can be of any desired composition. Such metals will be chosen so that, under the conditions applied, they will form a layer 10 that exhibits adequate reflectivity. Suitable metals may be chosen from, for example, silver, aluminum, gold and copper. Silver in particular may exhibit very high reflectivity. However, in some instances silver may be susceptible to corrosion. Accordingly, in some embodiments a corrosion-protection layer 25 may be disposed inward of reflective layer 10 as in the exemplary design of FIG. 3. Such a corrosion-protection layer may have any suitable composition, for example it may be e.g. copper, aluminum silicate, or silicon dioxide. In some embodiments, a corrosion-susceptible metal (e.g. silver) may be blended or otherwise intermixed with a protective metal such as e.g. copper or gold. In some embodiments reflective layer 10 may be aluminum (e.g. vapor-coated aluminum) which, although not being as reflective as silver, may be less in need of protection against corrosion.

Reflective metal layer 10 may be reflective (e.g. specularly reflective, diffusely reflective, or of some intermediate nature), for example, of visible radiation over a majority of wavelengths in the range of 400 to 700 nanometers, inclusive. In some embodiments, the reflective metal layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 700 nm.

The reflectivity of the reflective metal layer may be reflective over a broader wavelength range. Accordingly, in some embodiments, the reflectivity of the metal layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 2.5 micrometers, preferably at least 300 nm to 3.0 micrometers, although this is not a requirement.

As noted, the reflectivity of metal layer 10 may be chosen in view of the reflectivity achieved by organic polymeric layer 20. By way of a specific example, it was noted earlier that the reflectivity of a layer 20 that is a micro-voided film may depend on the total thickness of the micro-voided film. Thus, a layer 20 of this type that is, for example, 150 microns or more in thickness, may exhibit good reflectivity; thus, a metal layer 10 that is used in combination such a layer may not necessarily need to exhibit very high reflectivity. In contrast, if such a layer 20 is only, for example, 50 microns in thickness, the layer 20 may exhibit intermediate reflectivity and a metal layer 10 of higher reflectivity may be required in order to achieve the desired overall reflectivity. In various embodiments, metal layer 10 and organic polymeric layer 20 may meet any of the above-disclosed reflectance criteria, over any of the wavelength ranges noted, by acting in combination, regardless of the specific contribution from each layer.

It will be understood that the reflectivity achieved by a metal layer 10 may depend e.g. on the particular metal (or metals) used, and may also depend on the particular form in which the metal is arranged. For example, a continuous layer may achieve higher reflectivity than a layer that has gaps or is otherwise discontinuous. It will also be appreciated that if, for example, a metal layer is disposed (e.g. by vapor-coating) onto an inward surface 22 that is discontinuous (e.g. in the event that organic polymer layer 20 is a nonwoven), the metal may not form a perfectly continuous structure. Rather, gaps may be left in the metal layer; and, some parcels of metal may penetrate into the interior of layer 20. All such arrangements are encompassed by the disclosures herein and may be suitable depending e.g. on the characteristics of the layer 20 with which they are used. It is emphasized that all such arrangements, whether or not the metal is perfectly continuous and/or regardless of whether some portions of the metal penetrate into layer 20, are encompassed by the herein-disclosed concept of a metal layer that is disposed inwardly of an organic polymeric layer 20.

Antisoiling/UV-Absorbing Layer

Cooling film 1 will comprise an antisoiling layer 30 that also functions as a UV-absorbing layer. UV-absorbing layer 30, being disposed outward from reflective layer 10, provides UV protection for organic polymeric layer 20 which may e g enhance the usable lifetime of cooling film 1. That is, layer 30 can advantageously minimize or reduce ultraviolet radiation damage to layer 20.

A UV-absorbing layer is defined as transmitting less than 20% of radiation over a 30 nm bandwidth in a wavelength range of 300 nm to 400 nm. As used herein, the terminology of a UV-absorbing layer denotes a layer that absorbs, obstructs, dissipates, or otherwise prevents UV radiation from reaching layer 20, by a mechanism or combination of mechanisms that does not rely on reflectance to a significant extent. In various embodiments, a UV-absorbing layer (or set of layers) will be less than 40, 30, 20, 10 or 5 percent reflective of ultraviolet radiation over a majority of the wavelength range of 300-400 nm. UV-absorbing layers as disclosed herein are thus distinguished from reflective layers such as e.g. vapor-coated metal layers and the like, and are likewise distinguished from reflective items such as reflective multilayer optical films (MOFs) and individual optical layers thereof, and from dielectric mirrors comprised of e.g. inorganic layers.

In some embodiments, a UV-absorbing layer may include additives that have properties (e.g. wavelength-specific extinction coefficient, absorbance and/or /transmittance, etc.) that allow the additive to convert impinging UV radiation to heat which is then dissipated. (Such additives are often referred to as UV-absorbers.) In some embodiments, such a layer may include additives that act synergistically with a UV-absorber to enhance the performance of the UV-absorber. Such additives include many materials that are known as light-stabilizers or UV-stabilizers (e.g., hindered-amine light stabilizers or HALS). Various additives, of various categories, are discussed in detail later herein. Although some such additives may be discussed in the context of being present in a particular layer (e.g. in an adhesive layer or in a hardcoat layer), it is expressly noted that any such additive may be incorporated into either layer.

In some embodiments, a UV-absorbing layer may include opaque particles (e.g., inorganic fillers such as titanium dioxide, barium sulfate, kaolinite, and so on) that may be somewhat reflective in nature (different fillers may exhibit varying degrees of reflectivity versus absorption). However, as noted, the primary function of the UV-absorbing layer is to block UV radiation by mechanisms other than reflection. Thus in some embodiments, any such particles may serve primarily to dissipate UV radiation by scattering it. In some embodiments, a UV-absorbing layer may comprise less than 5, 2, 1, 0.5, 0.2, or 0.1 percent by weight of any such inorganic filler.

Any such additive that, when present in a layer and whether acting alone or in concert with some other additive, acts to block (e.g., mitigate or reduce) the passage of UV radiation to reach reflective layer 10 will be referred to herein as a UV-blocking additive. (As noted, such terminology encompasses additives that may be commonly referred to as e.g. UV-absorbing, UV-scattering, and UV-stabilizing.)

With regard to layer 30, this will be referred to herein for convenience as a UV-absorbing layer (as well as being an antisoiling layer). However, this term is used in a general sense; in view of the above discussions, layer 30 is not limited to including only additives that operate solely by direct absorption of UV radiation and dissipation of the UV energy in the form of heat. Layer 30 may equivalently be termed a UV-blocking layer or a UV-dissipating layer.

As disclosed herein, antisoiling, UV-absorbing layer 30 takes the form of a coating on the outward side of organic polymeric layer 20 (or on the outward side of any layer present thereon). Such a coating may be obtained by disposing a precursor coating composition atop layer 20 and then solidifying the precursor (e.g. by removal of solvent or any liquid carrier, by cross-linking, and so on) to form the final coating. The disposing of the precursor may be performed in any suitable manner; e.g. knife-coating, gravure-coating, slide-coating, slot-die coating, curtain-coating, and so on. The resulting coating may have a protective character (e.g. providing abrasion resistance, scratch resistance, and so on); such coatings are often referred to as hardcoats, which terminology will be used herein. Numerous coatings of this general type are known in the art including, for example, those described in U.S Pat. Appln. Pub. 2015/0175479 (Brown et al.), U.S. Pat. Nos. 6,991,826 (Pellerite et al.) and 6,277,485 (Invie et al.), and WO 02/12404 (Liu et al.). Commercially available hardcoats include products available under the trade designation SHIKOH from Mitsubishi Chemicals, and products available under the trade designation PERMA-NEW from California Hardcoating Company, Chula Vista, Calif. Some such hardcoats may be of the general type described in U.S. Pat. No. 6,265,029. In some embodiments the outward surface 31 of hardcoat 30 may be textured to enhance the antisoiling properties of the hardcoat, as discussed in detail later herein.

As noted, such a hardcoat 30 may serve as both a UV-absorbing layer and as an antisoiling layer 30. In such embodiments, the hardcoat may include an appropriate amount of UV-blocking additive(s); if desired, the hardcoat may comprise a textured surface 31 for the purposes noted above. In some embodiments, the hardcoat 30 may serve as the only UV-absorbing layer that protects organic polymeric layer 20.

In some embodiments, the hardcoat may be based on a coating composition that relies at least in part on methacrylate materials. For example, in some embodiments the coating composition may include a poly(methyl methacrylate) (PMMA) polymer, which may be a homopolymer or copolymer. The PMMA polymer or copolymer has a weight average molecular weight of at least 50,000 grams per mole. In some embodiments, the PMMA polymer or copolymer has a weight average molecular weight of at least 75,000 grams per mole, 100,000 grams per mole, 120,000 grams per mole, 125,000 grams per mole, 150,000 grams per mole, 165,000 grams per mole, or 180,000 grams per mole. The PMMA polymer or copolymer may have a weight average molecular weight of up to 500,000 grams per mole, in some embodiments, up to 400,000 grams per mole, and in some embodiments, up to 250,000 grams per mole. Weight average molecular weights can be measured, for example, by gel permeation chromatography (i.e., size exclusion chromatography (SEC)) using techniques known in the art.

Useful copolymers of PMMA include those made from a $C_2$-$C_8$ alkyl acrylate or methacrylate or a $C_3$-$C_8$ cycloalkyl acrylate or methacrylate in combination with methyl methacrylate. In some embodiments, the copolymer of PMMA includes at least one of ethyl acrylate, ethyl methacrylate, butyl acrylate, or butyl methacrylate. In some embodiments, the copolymer is made from starting monomers including methylmethacrylate in a range from 50 weight percent to 90 weight percent (in some embodiments from 60 to 85 weight percent) and a $C_2$-$C_8$ alkyl acrylate or methacrylate or a $C_3$-$C_8$ cycloalkyl acrylate or methacrylate in a range from 10 weight percent to 50 weight percent (in some embodiments from 15 to 40 weight percent), based on the total weight of the monomers. In some of these embodiments, the $C_2$-$C_8$ alkyl acrylate or methacrylate or $C_3$-$C_8$ cycloalkyl acrylate or methacrylate is ethyl acrylate or n-butyl methacrylate. Useful copolymers of PMMA are commercially available, for example, from The Dow Chemical Company, Midland, Mich., under the trade designation "PARALOID" and from Lucite International, Inc., Memphis, Tenn., under the trade designation "PERSPEX" and "ELVACITE". In some embodiments, employing a copolymer of methyl methacrylate and n-butyl methacrylate in the coating compositions may improve the abrasion resistance of the resulting hardcoat.

The PMMA polymer or copolymer is a linear polymer or copolymer and is typically non-functional. That is, the PMMA polymer or copolymer does not typically contain reactive groups such as carboxylic acids, sulfonic acids, amino groups, and polymerizable carbon-carbon double bonds.

The coating composition according to the present disclosure may include e.g. an alkylene diacrylate, alkylene dimethacrylate, cycloalkylene diacrylate, or cycloalkylenedimethacrylate. The alkylene diacrylate, alkylene dimethacrylate, cycloalkylene diacrylate, or cycloalkylenedimethacrylate can conveniently be a liquid at room temperature. The alkylene diacrylate or dimethacrylate is typically a $C_2$-$C_{10}$ alkylene diacrylate or dimethacrylate or a $C_4$-$C_6$ cycloalkylene diacrylate or dimethacrylate with no substituents on the alkylene or the cycloalkylene group. The alkylene group in the diacrylate or dimethacrylate, by definition, does not include any heteroatoms or functional groups that interrupt the carbon chain, and the cycloalkylene group in the diacrylate or dimethacrylate, by definition, does not include any heteroatoms in the ring. The alkylene group may be straight chain or branched. Without wanting to be bound by theory, it is believed branching in the alkylene group may result in a cured coating that has a lower modulus, which can increase the abrasion resistance of the cured coating compositions in some embodiments. Examples of useful difunctional acrylates and methacrylates include hexanediol diacrylate, hexanediol dimethacrylate, neopentyl glycol diacrylate, and neopentyl glycol dimethacrylate. It has been found that the coating compositions disclosed herein have good adhesion to many polymeric substrates after curing even in the absence of, e.g., alkyleneoxy groups in the acrylic monomers.

The alkylene diacrylate, alkylene dimethacrylate, cycloalkylene diacrylate, and/or cycloalkylenedimethacrylate may provide e.g. at least 80 percent by weight of the monomer in the coating composition. In some embodiments, the alkylene diacrylate, alkylene dimethacrylate, cycloalkylene diacrylate, and/or cycloalkylenedimethacrylate provide at least 85, 90, 95, 96, 97, 98, 99, or even 100 percent by weight of the monomer. In other words, monomers (e.g., acrylic monomers) other than the alkylene diacrylate, alkylene dimethacrylate, cycloalkylene diacrylate, and/or cycloalkylenedimethacrylate make up not more than (e.g., less than) 20, 15, 10, 5, 4, 3, 2, or 1 percent by weight, based on the total weight of the monomer in the coating composition. In some embodiments, the coating composition may be considered to be substantially free of monomers (e.g., acrylic monomers) other than the alkylene diacrylate, alkylene dimethacrylate, cycloalkylene diacrylate, and/or cycloalkylenedimethacrylate. In some embodiments, the monomer in the coating composition may be considered to consist of an alkylene diacrylate, an alkylene dimethacrylate, a cycloalkylene diacrylate, a cycloalkylenedimethacrylate, or a combination thereof.

In many embodiments, the coating compositions disclosed herein therefore do not have significant amounts of monofunctional acrylates or methacrylates (e.g. more than about 15 percent by weight, based on the total weight of the monomer in the coating composition). In some embodiments, the monomer includes not more than 15, 10, 5, 4, 3, 2, or 1 percent by weight monofunctional acrylate or methacrylate, based on the total weight of the monomer in the coating composition.

In many embodiments, the coating compositions disclosed herein also do not have significant amounts of tri-, tetra-, or higher functional acrylates or methacrylates (e.g. more than about 10 percent by weight, based on the total weight of the monomer in the coating composition). In some embodiments, the monomer includes not more than 7.5, 5, 4, 3, 2, or 1 percent by weight tri-, tetra-, or higher functional acrylate or methacrylate, based on the total weight of the monomer in the coating composition.

In some embodiments, the hardcoat prepared from the coating composition disclosed herein has an elongation of less than 50% (in some embodiments, less than 25% or less than 10%). In some embodiments, these acrylate-based coating compositions do not include urethane acrylates or include not more than 10, 5, 3, or 1 percent by weight of a urethane acrylate, based on the total weight of the monomer in the coating composition. Also, by definition, the alkylene or cycloalkylene diacrylates or dimethacrylates are not prepared from urethanes and are free of urethane and urea groups.

In the coating compositions disclosed herein, a variety of ratios of the monomer comprising at least one of alkylene diacrylate, alkylene dimethacrylate, cycloalkylene diacrylate, or cycloalkylenedimethacrylate to the poly(methyl methacrylate) polymer or copolymer may be useful. In any of the embodiments of the PMMA polymer or copolymer or the monomer described above, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer may be in a range from 0.75:1 to 15:1. Also, in any of the aforementioned embodiments, the monomer may be present in the composition in a range from 20 percent by weight to 90 percent by weight (in some embodiments, 20 percent by weight to 80 percent by weight or 23 percent by weight to 75 percent by weight), based on the total weight of the non-volatile components of the composition. The PMMA polymer or copolymer may be present in the composition in a range from 2 percent by weight to 40 percent by weight (in some embodiments, 4 percent by weight to less than 40 percent by weight such as 39, 38, or 37 percent by weight) based on the total weight of the non-volatile components of the composition. In some embodiments, for example, embodiments in which the coating composition does not contain any filler, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 5:1, 1:1 to 4:1, or 1.5:1 to 3:1. In any of these embodiments, the monomer may be present in the composition in a range from 40 percent by weight to 90 percent by weight (in some embodiments, 41, 42, 43, 44, or 45 percent by weight to 90 or 80 percent by weight), based on the total weight of the non-volatile components of the composition, and the PMMA polymer or copolymer may be present in the composition in a range from 20 percent by weight to 40 percent by weight (in some embodiments, 20 percent by weight to less than 40 percent by weight such as 39, 38, or 37 percent by weight) based on the total weight of the non-volatile components of the composition. In some embodiments, for example, embodiments in which the coating composition includes filler as described in further detail below, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 15:1, 0.75:1 to 12.5:1, or 1:1 to 10:1. Acrylate-based hardcoats are described in further detail in U.S. Pat. No. 10,072,173, which is incorporated by reference in its entirety herein.

Regardless of the particular polymeric composition, in some embodiments a hardcoat may include inorganic particles such as e.g. inorganic oxide particles (e.g. silica, zirconia, titania, antimony oxides, alumina, and so on). In various embodiments any such particles may have an average size of up to e.g. 500 nanometers. Such particles may, for example, enhance the strength, mechanical durability, abrasion resistance, scratch resistance, etc., of the hardcoat.

In some embodiments, such particles may enhance the ability of the hardcoat to be textured (e.g. to further enhance antisoiling) e.g. by removal of organic polymeric material (e.g. by etching) with the inorganic particles remaining in place thus imparting the surface of the hardcoat with texture. Various inorganic particles that may find use in a hardcoat are discussed in detail in the above-cited '173 US Patent. The '173 patent also includes an extensive discussion of UV-blocking (e.g. UV-absorbing) additives that may be incorporated into a hardcoat; it will be understood that any such additive(s) (and, in general, any of the additives disclosed elsewhere herein) may be included in a hardcoat.

It will be understood that the above-described acrylate-based hardcoats are merely exemplary and that the composition may be varied in some circumstances. In general, such a hardcoat (whether serving as a UV-absorbing layer, an antisoiling layer, or both), is not limited to being an acrylate-based composition. Other possibly suitable compositions (exhibiting e.g. scratch resistance and the like) are disclosed e.g. in U.S. Pat. No. 9,523,516, which is incorporated by reference in its entirety herein. Regardless of the particular composition, a hardcoat layer 30 will be distinguished from any layer that fails to exhibit hardness, wear and durability properties commensurate with the layer functioning as a hardcoat. In some embodiments a hardcoat layer as disclosed herein may exhibit a Pencil Hardness (as obtained in general accordance with the procedures outlined in ASTM Test Method D3363-05(2011)e2, e.g. using a GARDCO 5021 PENCIL HARDNESS TESTER or the equivalent) of at least 3H, 5H, 7H, or 9H. Materials such as pressure-sensitive adhesive layers and the like, by definition are not hardcoats as disclosed herein.

Textured Antisoiling Surface

In some embodiments, the outward facing surface 31 of hardcoat/antisoiling/UV-absorbing layer 30 (i.e., opposite the organic polymeric layer 20) may be textured so as to be microstructured and/or nanostructured over some or all of its surface; for example, as described in U.S. Provisional Patent Application No. 62/611,636 and in the resulting PCT International Application Publication No. WO 2019/130198, both of which are incorporated by reference in their entirety herein. The use of such micro and/or nano structuring for the specific purpose of enhancing antisoiling of a cooling film is discussed in U.S. Patent Application U.S. Provisional Patent Application No. 62/855,392, which is incorporated by reference in its entirety herein.

In some embodiments, the nanostructure may be superimposed on the microstructure on the surface of the antisoiling layer. In some such embodiments, the antisoiling layer has a major surface (i.e., an antisoiling surface) that includes micro-structures and/or nano-structures. The micro-structures may be arranged as a series of alternating micro-peaks and micro-spaces. The size and shape of the micro-spaces between micro-peaks may mitigate the adhesion of dirt particles to the micro-peaks. The nano-structures may be arranged as at least one series of nano-peaks disposed on at least the micro-spaces. The micro-peaks may be more durable to environmental effects than the nano-peaks. Because the micro-peaks are spaced only by a micro-space, and the micro-spaces are significantly taller than the nano-peaks, the micro-peaks may serve to protect the nano-peaks on the surface of the micro-spaces from abrasion.

In reference to the antisoiling layer, the term or prefix "micro" refers to at least one dimension defining a structure or shape being in a range from 1 micrometer to 1 millimeter. For example, a micro-structure may have a height or a width that is in a range from 1 micrometer to 1 millimeter.

As used herein, the term or prefix "nano" refers to at least one dimension defining a structure or a shape being less than 1 micrometer. For example, a nano-structure may have at least one of a height or a width that is less than 1 micrometer.

Figure 4A:
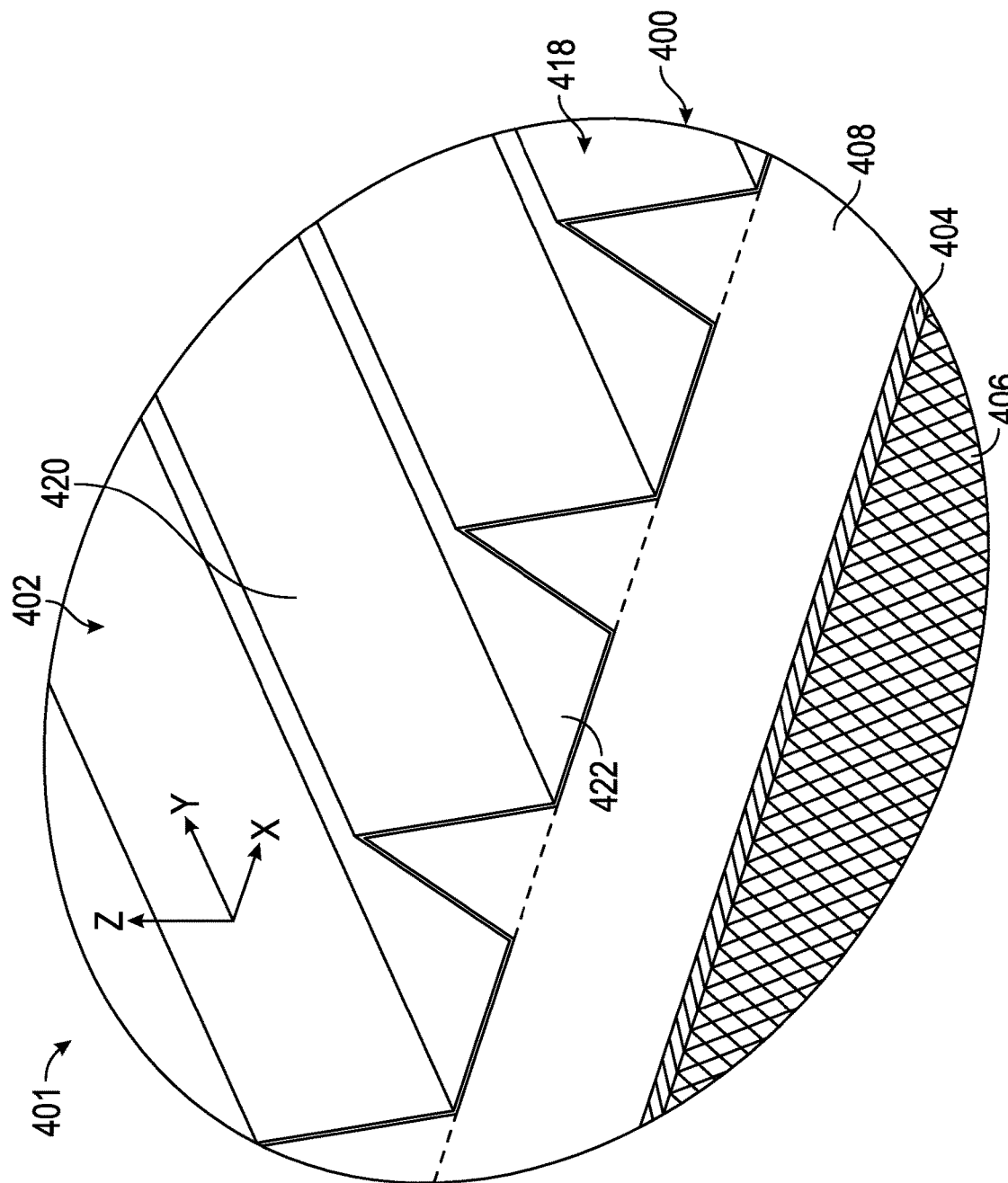
FIGS. 4A, 4B, and 4C are views of an exemplary antisoiling surface structure having micro-structures.
Figure 4B:
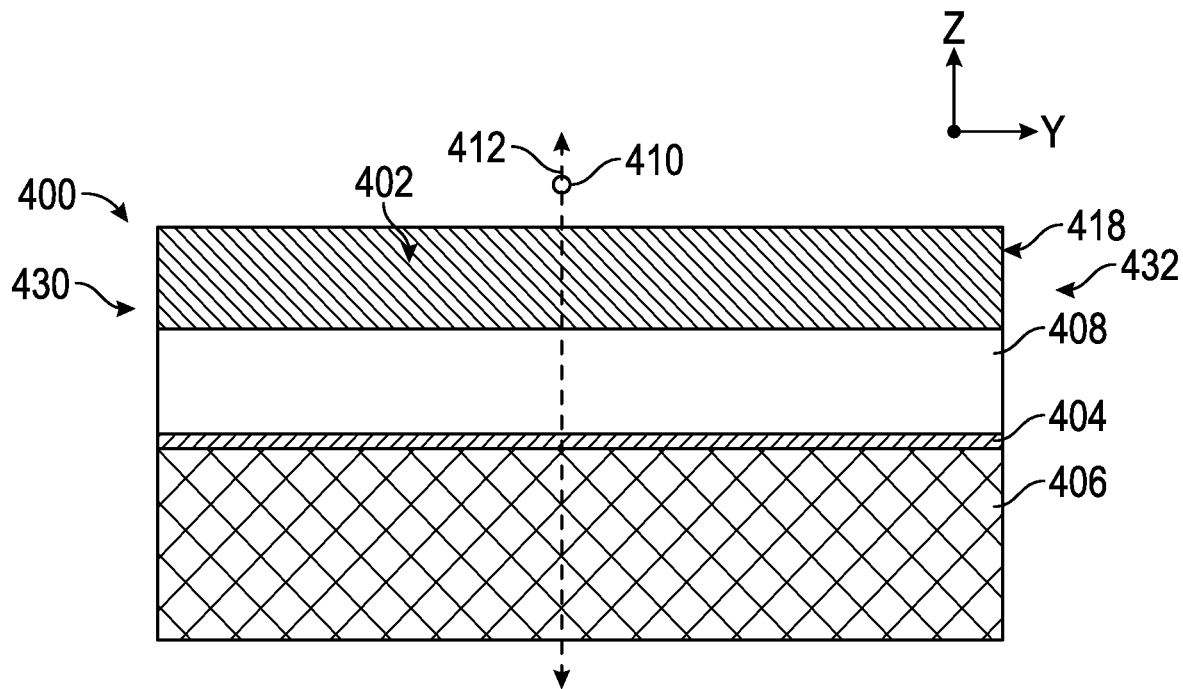
Figure 4C:
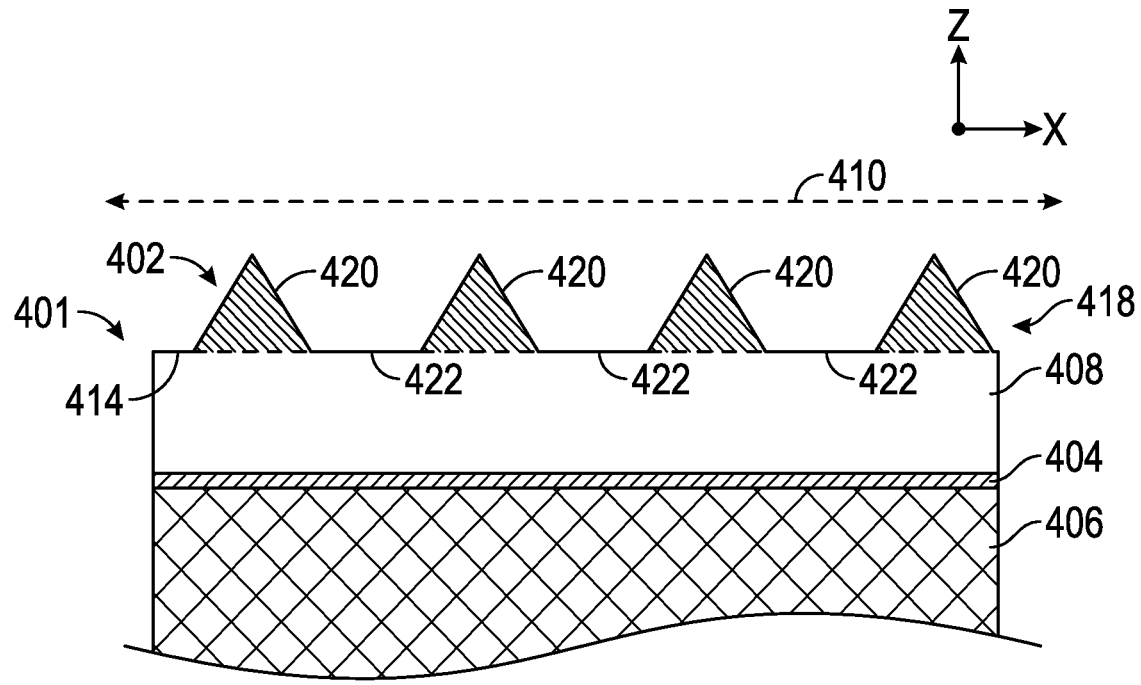

FIGS. 4A, 4B, and 4C show cross-sections 400, 401 of an antisoiling surface structure, shown as antisoiling layer 408 having antisoiling surface 402 defined by a series of micro-structures 418. In particular, FIG. 4A shows a perspective view of the cross section 401 relative to xyz-axes. FIG. 4C shows cross section 401 in an xz-plane parallel to axis 410. FIG. 4B shows cross section 400 in a yz-plane orthogonal to cross section 401 and orthogonal to axis 410. Antisoiling surface 402 is depicted in FIGS. 4A-4C as if antisoiling layer 408 were lying on a flat horizontal surface. Antisoiling layer 408, however, may be flexible and may conform to substrates that are not flat.

In some embodiments, micro-structures 418 are formed in antisoiling layer 408. Micro-structures 418 and remaining portions of antisoiling layer 408 below the micro-structures may be formed of the same material. Antisoiling layer 408 may be formed of any suitable material capable of defining micro-structures 418, which may at least partially define antisoiling surface 402. Antisoiling layer 408 may be transparent to various frequencies of light. In at least one embodiment, antisoiling layer 408 may be non-transparent, or even opaque, to various frequencies of light. In some embodiments, Antisoiling layer 408 may include, or be made of, an UV stable material, and/or may include a UV-blocking additive.

Antisoiling surface 402 may extend along axis 410, for example, parallel or substantially parallel to the axis. Plane 412 may contain axis 410, for example, parallel or intersecting such that axis 410 is in plane 412. Both axis 410 and plane 412 may be imaginary constructs used herein to illustrate various features related to antisoiling surface 402. For example, the intersection of plane 412 and antisoiling surface 402 may define line 414 describing a cross-sectional profile of the surface as shown in FIG. 4C that includes micro-peaks 420 and micro-spaces 422 as described herein in more detail. Line 414 may include at least one straight segment or curved segments.

Line 414 may at least partially define series of micro-structures 418. micro-structures 418 may be three-dimensional (3D) structures disposed on antisoiling layer 408, and line 414 may describe only two dimensions (e.g., height and width) of that 3D structure. As can be seen in FIG. 4B, micro-structures 418 may have a length that extends along surface 402 from one side 430 to another side 432.

Micro-structures 418 may include a series of alternating micro-peaks 420 and micro-spaces 422 along, or in the direction of, axis 410, which may be defined by, or included in, line 414. The direction of axis 410 may coincide with a width dimension. Micro-spaces 422 may each be disposed between pair of micro-peaks 420. In other words, plurality of micro-peaks 420 may be separated from one another by at least one micro-spaces 422. In at least one embodiments, at least one pair of micro-peaks 420 may not include micro-space 422 in-between. Pattern of alternating micro-peaks 420 and micro-spaces 422 may be described as a "skipped tooth riblet" (STR). Each of micro-peaks 420 and micro-spaces 422 may include at least one straight segment or curved segment.

A slope of line 414 (e.g., rise over run) may be defined relative to the direction of axis 410 as an x-coordinate (run) and relative to the direction of plane 412 as a y-axis (rise).

A maximum absolute slope may be defined for at least one portion of line 414. As used herein, the term "maximum absolute slope" refers to a maximum value selected from the absolute value of the slopes throughout a particular portion of line 414. For example, the maximum absolute slope of one micro-space 422 may refer to a maximum value selected from calculating the absolute values of the slopes at every point along line 414 defining the micro-space.

A line defined the maximum absolute slope of each micro-space 422 may be used to define an angle relative to axis 410. In some embodiments, the angle corresponding to the maximum absolute slope may be at most 30 (in some embodiments, at most 25, 20, 15, 10, 5, or even at most 1) degrees. In some embodiments, the maximum absolute slope of at least some (in some embodiments, all) of micro-peaks 420 may be greater than the maximum absolute slope of at least some (in some embodiments, all) of micro-spaces 422.

In some embodiments, line 414 may include boundary 416 between each adjacent micro-peak 420 and micro-space 422. Boundary 416 may include at least one of straight segment or curved segment. Boundary 416 may be a point along line 414. In some embodiments, boundary 416 may include a bend. The bend may include the intersection of two segments of line 414. The bend may include a point at which line 414 changes direction in a locale (e.g., a change in slope between two different straight lines). The bend may also include a point at which line 414 has the sharpest change in direction in a locale (e.g., a sharper turn compared to adjacent curved segments). In some embodiments, boundary 416 may include an inflection point. An inflection point may be a point of a line at which the direction of curvature changes.

Figure 5:
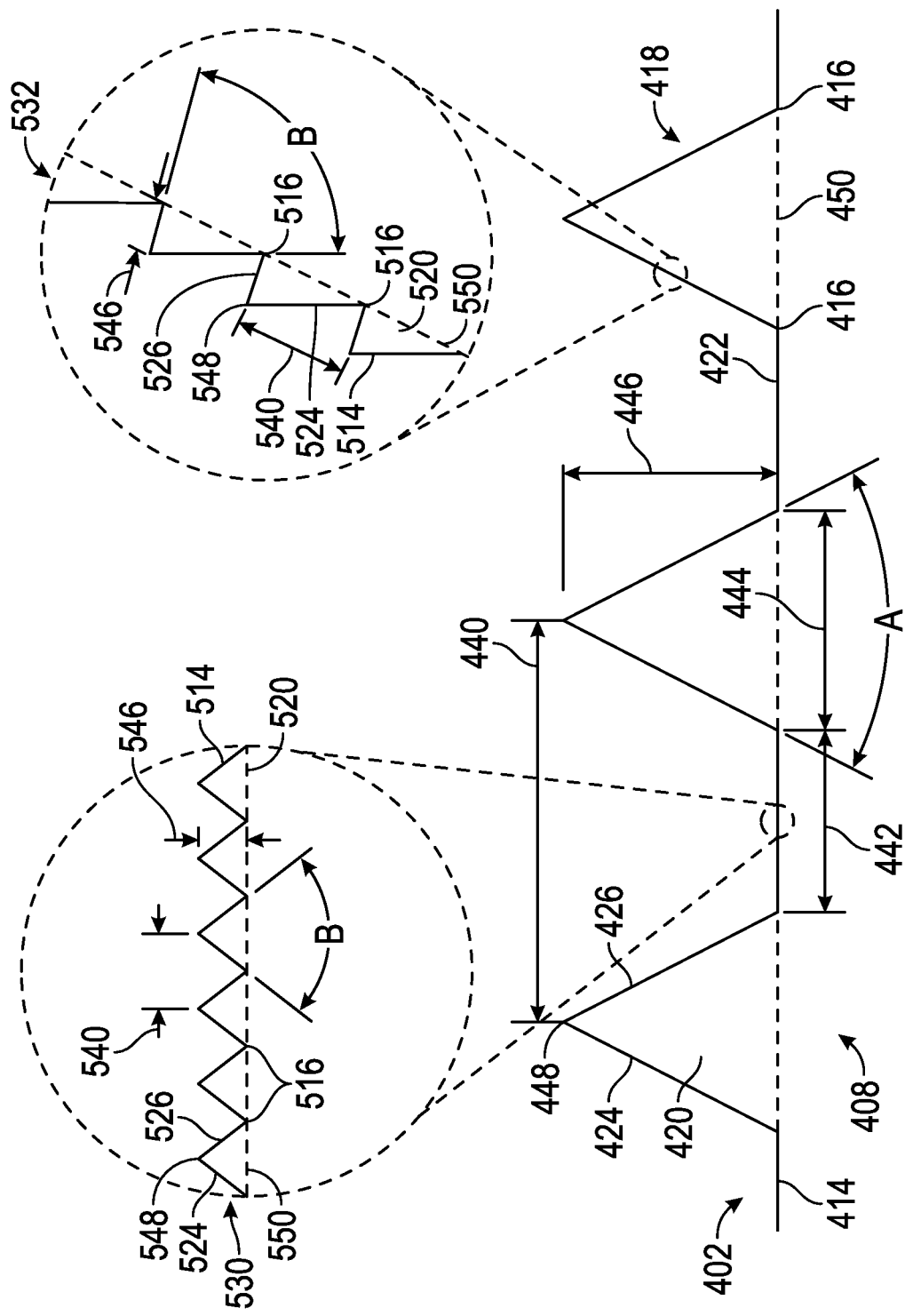
FIG. 5 is a cross-sectional illustration of various nano-structures of the antisoiling surface structure of FIGS. 4A-4C in an xz-plane.

FIG. 5 shows antisoiling surface 402 of antisoiling layer 408 with nano-structures 530, 532, which are visible in two magnified overlays. At least one micro-peak 420 may include at least one first micro-segment 424 or at least one second micro-segment 426. Micro-segments 424, 426 may be disposed on opposite sides of apex 448 of micro-peak 420. Apex 448 may be, for example, the highest point or local maxima of line 414. Each micro-segment 424, 426 may include at least one: straight segment or curved segment.

Line 414 defining first and second micro-segments 424, 426 may have a first average slope and a second average slope, respectively. The slopes may be defined relative to baseline 450 as an x-axis (run), wherein an orthogonal direction is the z-axis (rise).

As used herein, the term "average slope" refers to an average slope throughout a particular portion of a line. In some embodiments, the average slope of first micro-segment 424 may refer to the slope between the endpoints of the first micro-segment. In some embodiments, the average slope of first micro-segment 424 may refer to an average value calculated from the slopes measured at multiple points along the first micro-segment.

In general, the micro-peak first average slope may be defined as positive and the micro-peak second average slope may be defined as negative. In other words, the first average slope and the second average slope have opposite signs. In some embodiments, the absolute value of the micro-peak first average slope may be equal to the absolute value of the micro-peak second average slope. In some embodiments, the absolute values may be different. In some embodiments, the absolute value of each average slope of micro-segments 424, 426 may be greater than the absolute value of the average slope of micro-space 422.

Angle A of micro-peaks 420 may be defined between the micro-peak first and second average slopes. In other words, the first and second average slopes may be calculated and then an angle between those calculated lines may be determined. For purposes of illustration, angle A is shown as relating to first and second micro-segments 424, 426. In some embodiments, however, when the first and second micro-segments are not straight lines, the angle A may not necessarily be equal to the angle between two micro-segments 424, 426.

Angle A may be in a range to provide sufficient antisoiling properties for surface 202. In some embodiments, angle A may be at most 120 (in some embodiments, at most 110, 100, 95, 90, 85, 80, 75, 70, 65, 60, 55, 50, 45, 40, 35, 30, 25, 20, or even at most 10) degrees. In some embodiments, angle A is at most 85 (in some embodiments, at most 75) degrees. In some embodiments, angle A is, at the low end, at least 30 (in some embodiments, at least 25, 40, 45, or even at least 50) degrees. In some embodiments, angle A is, at the high end, at most 75 (in some embodiments, at most 60, or even at most 55) degrees.

Micro-peaks 420 may be any suitable shape capable of providing angle A based on the average slopes of micro-segments 424, 426. In some embodiments, micro-peaks 420 are generally formed in the shape of a triangle. In some embodiments, micro-peaks 420 are not in the shape of a triangle. The shape may be symmetrical across a z-axis intersecting apex 448. In some embodiments, the shape may be asymmetrical.

Each micro-space 422 may define micro-space width 242. Micro-space width 442 may be defined as a distance between corresponding boundaries 416, which may be between adjacent micro-peaks 420.

A minimum for micro-space width 442 may be defined in terms of micrometers. In some embodiments, micro-space width 442 may be at least 10 (in some embodiments, at least 20, 25, 30, 40, 50, 60, 70, 75, 80, 90, 100, 150, 200, or even at least 250) micrometers. In some applications, micro-space width 442 is, at the low end, at least 50 (in some embodiments, at least 60) micrometers. In some applications, micro-space width 442 is, at the high end, at most 90 (in some embodiments, at most 80) micrometers. In some applications, micro-space width 442 is 70 micrometers.

As used herein, the term "peak distance" refers to the distance between consecutive peaks, or between the closest pair of peaks, measured at each apex or highest point of the peak.

Micro-space width 442 may also be defined relative to micro-peak distance 440. In particular, a minimum for micro-space width 442 may be defined relative to corresponding micro-peak distance 440, which may refer to the distance between the closest pair of micro-peaks 420 surrounding micro-space 422 measured at each apex 448 of the micro-peaks. In some embodiments, micro-space width 442 may be at least 10% (in some embodiments, at least 20%, 25%, 30%, 40%, 50%, 60%, 70%, 80%, or even at least 90%) of the maximum for micro-peak distance 440. In some embodiments, the minimum for micro-space width 442 is, at the low end, at least 30% (in some embodiments, at least 40%) of the maximum for micro-peak distance 440. In some embodiments, the minimum for micro-space width 442 is, at the high end, at most 60% (in some embodiments, at most 50%) of the maximum for micro-peak distance 440. In some embodiments, micro-space width 442 is 45% of micro-peak distance 440.

A minimum the micro-peak distance 440 may be defined in terms of micrometers. In some embodiments, micro-peak distance 440 may be at least 1 (in some embodiments, at least 2, 3, 4, 5, 10, 25, 50, 75, 100, 150, 200, 250, or even at least 500) micrometers. In some embodiments, micro-peak distance 440 is at least 100 micrometers.

A maximum for micro-peak distance 440 may be defined in terms of micrometers. Micro-peak distance 440 may be at most 1000 (in some embodiments, at most 900, 800, 700, 600, 500, 400, 300, 250, 200, 150, 100, or even at most 50) micrometers. In some embodiments, micro-peak distance 440 is, at the high end, at most 200 micrometers. In some embodiments, micro-peak distance 440 is, at the low end, at least 100 micrometers. In some embodiments, micro-peak distance 440 is 150 micrometers.

Each micro-peak 420 may define micro-peak height 446. Micro-peak height 446 may be defined as a distance between baseline 550 and apex 448 of micro-peak 420. A minimum may be defined for micro-peak height 446 in terms of micrometers. In some embodiments, micro-peak height 446 may be at least 10 (in some embodiments, at least 20, 25, 30, 40, 50, 60, 70, 80, 90, 100, 150, 200, or even at least 250) micrometers. In some embodiments, micro-peak height 446 is at least 60 (in some embodiments, at least 70) micrometers. In some embodiments, micro-peak height 446 is 80 micrometers.

Plurality of nano-structures 530, 532 may be defined at least partially by line 414. Plurality of nano-structures 530 may be disposed on at least one or micro-space 422. In particular, line 514 defining nano-structures 530 may include at least one series of nano-peaks 520 disposed on at least one micro-space 422. In some embodiments, at least one series of nano-peaks 520 of plurality of nano-structures 532 may also be disposed on at least one micro-peak 420.

Due to at least their difference in size, micro-structures 418 may be more durable than nano-structures 530, 532 in terms of abrasion resistance. In some embodiments, plurality of nano-structures 532 are disposed only on micro-spaces 422 or at least not disposed proximate to or adjacent to apex 448 of micro-peaks 420.

Each nano-peak 520 may include at least one of first nano-segment 524 and second nano-segment 526. Each nano-peak 520 may include both nano-segments 524, 526. Nano-segments 524, 526 may be disposed on opposite sides of apex 548 of nano-peak 520.

First and second nano-segments 524, 526 may define a first average slope and a second average slope, respectively, which describe line 514 defining the nano-segment. For nano-structures 530, 532, the slope of line 514 may be defined relative to baseline 550 as an x-axis (run), wherein an orthogonal direction is the z-axis (rise).

In general, the nano-peak first average slope may be defined as positive and the nano-peak second average slope may be defined as negative, or vice versa. In other words, the first average slope and the second average slope at least have opposite signs. In some embodiments, the absolute value of the nano-peak first average slope may be equal to the absolute value of the nano-peak second average slope (e.g., nano-structures 530). In some embodiments, the absolute values may be different (e.g., nano-structures 532).

Angle B of nano-peaks 520 may be defined between lines defined by the nano-peak first and second average slopes. Similar to angle A, angle B as shown is for purposes of illustration and may not necessarily equal to any directly measured angle between nano-segments 524, 526.

Angle B may be a range to provide sufficient antisoiling properties for surface 402. In some embodiments, angle B may be at most 120 (in some embodiments, at most 110, 100, 90, 85, 80, 75, 70, 65, 60, 55, 50, 45, 40, 35, 30, 25, 20, or even at most 10) degrees. In some embodiments, angle B is, at the high end, at most 85 (in some embodiments, at most 80, or even at most 75) degrees. In some embodiments, angle B is, at the low end, at least 55 (in some embodiments, at least 60, or even at least 65) degrees. In some embodiments, angle B is 70 degrees.

Angle B may be the same or different for each nano-peak 520. For example, in some embodiments, angle B for nano-peaks 520 on micro-peaks 420 may be different than angle B for nano-peaks 520 on micro-spaces 422.

Nano-peaks 520 may be any suitable shape capable of providing angle B based on lines defined by the average slopes of nano-segments 524, 526. In some embodiments, nano-peaks 520 are generally formed in the shape of a triangle. In at least one embodiments, nano-peaks 520 are not in the shape of a triangle. The shape may be symmetrical across apex 548. For example, nano-peaks 520 of nano-structures 530 disposed on micro-spaces 422 may be symmetrical. In at least one embodiments, the shape may be asymmetrical. For example, nano-peaks 520 of nano-structures 532 disposed on micro-peaks 420 may be asymmetrical with one nano-segment 524 being longer than other nano-segment 526. In some embodiments, nano-peaks 520 may be formed with no undercutting.

Each nano-peak 520 may define nano-peak height 546. Nano-peak height 546 may be defined as a distance between baseline 550 and apex 548 of nano-peak 520. A minimum may be defined for nano-peak height 546 in terms of nanometers. In some embodiments, nano-peak height 546 may be at least 10 (in some embodiments, at least 50, 75, 100, 120, 140, 150, 160, 180, 200, 250, or even at least 500) nanometers.

In some embodiments, nano-peak height 546 is at most 250 (in some embodiments, at most 200) nanometers, particularly for nano-structures 530 on micro-spaces 422. In some embodiments, nano-peak height 546 is in a range from 100 to 250 (in some embodiments, 160 to 200) nanometers. In some embodiments, nano-peak height 546 is 180 nanometers.

In some embodiments, nano-peak height 546 is at most 160 (in some embodiments, at most 140) nanometers, particularly for nano-structures 532 on micro-peaks 420. In some embodiments, nano-peak height 546 is in a range from 75 to 160 (in some embodiments, 100 to 140) nanometers. In some embodiments, nano-peak height 546 is 120 nanometers.

As used herein, the terms "corresponding micro-peak" or "corresponding micro-peaks" refer to micro-peak 420 upon which nano-peak 520 is disposed or, if the nano-peak is disposed on corresponding micro-space 422, refers to one or both of the closest micro-peaks that surround that micro-space. In other words, micro-peaks 420 that correspond to micro-space 422 refer to the micro-peaks in the series of micro-peaks that precede and succeed the micro-space.

Nano-peak height 546 may also be defined relative to micro-peak height 446 of corresponding micro-peak 420. In some embodiments, corresponding micro-peak height 446 may be at least 10 (in some embodiments, at least 50, 100, 150, 200, 300, 400, 500, 600, 700, 800, 900, or even at least 1000) times nano-peak height 546. In some embodiments, corresponding micro-peak height 446 is, at the low end, at least 300 (in some embodiments, at least 400, 500, or even at least 600) times nano-peak height 546. In some embodiments, corresponding micro-peak height 446 is, at the high end, at most 900 (in some embodiments, at most 800, or even at most 700) times nano-peak height 546.

Nano-peak distance 540 may be defined between nano-peaks 520. A maximum for nano-peak distance 540 may be defined. In some embodiments, nano-peak distance 540 may be at most 1000 (in some embodiments, at most 750, 700, 600, 500, 400, 300, 250, 200, 150, or even at most 100) nanometers. In some embodiments, nano-peak distance 540 is at most 400 (in some embodiments, at most 300) nanometers.

A minimum for the nano-peak distance 540 may be defined. In some embodiments, nano-peak distance 540 may be at least 1 (in some embodiments, at least 5, 10, 25, 50, 75, 100, 150, 200, 250, 300, 350, 400, 450, or even at least 500) nanometers. In some embodiments, nano-peak distance 540 is at least 150 (in some embodiments, at least 200) nanometers.

In some embodiments, the nano-peak distance 540 is in a range from 150 to 400 (in some embodiments, 200 to 300) nanometers. In some embodiments, the nano-peak distance 540 is 250 nanometers.

Nano-peak distance 540 may be defined relative to the micro-peak distance 440 between corresponding micro-peaks 420. In some embodiments, corresponding micro-peak distance 440 is at least 10 (in some embodiments, at least 50, 100, 200, 300, 400, 500, 600, 700, 800, 900, or even at least 1000) times nano-peak distance 540. In some embodiments, corresponding micro-peak distance 440 is, at the low end, at least 200 (in some embodiments, at least 300) times nano-peak distance 540. In some embodiments, corresponding micro-peak distance 440 is, at the high end, at most 500 (in some embodiments, at most 400) times the nano-peak distance 540.

In some embodiments, a method of forming hardcoat 30 may include coating a hardcoat precursor e.g. onto outward major surface 21 of organic polymeric layer 20. Then, while the hardcoat precursor has not yet fully hardened into hardcoat 30, the outward surface 31 of the precursor may be brought against a suitable molding tool, e.g. a micro-replication (and/or nano-replication) tool. The tool may include a mirror image of a series of micro-structures, which may form the series of micro-structures on the surface of antisoiling layer 208. The series of micro-structures may include a series of alternating micro-peaks and micro-spaces along an axis. A plurality of nano-structures may be formed on the surface of the layer on at least the micro-spaces. The plurality of nano-peaks may include at least one series of nano-peaks along the axis.

In some embodiments, the plurality nano-structures may be formed by exposing the surface to reactive ion etching. For example, masking elements may be used to define the nano-peaks.

In some embodiments, the plurality of nano-structures may be formed by shaping the extruded material with the micro-replication tool further having an ion-etched diamond. This method may involve providing a diamond tool wherein at least a portion of the tool comprises a plurality of tips, wherein the pitch of the tips may be less than 1 micrometer, and cutting a substrate with the diamond tool, wherein the diamond tool may be moved in and out along a direction at a pitch ($p_1$). The diamond tool may have a maximum cutter width ($p_2$) and $p_1/p_2 \geq 2$.

The nano-structures may be characterized as being embedded within the micro-structured surface of the antisoiling layer. Except for the portion of the nano-structure exposed to air, the shape of the nano-structure may generally be defined by the adjacent micro-structured material.

A micro-structured surface layer including nano-structures can be formed by use of a multi-tipped diamond tool. Diamond Turning Machines (DTM) can be used to generate micro-replication tools for creating antisoiling surface structures including nano-structures as described in U.S. Pat. Appl. Publ. No. 2013/0236697 (Walker et al.) A micro-structured surface further comprising nano-structures can be formed by use of a multi-tipped diamond tool, which may have a single radius, wherein the plurality of tips has a pitch of less than 1 micrometer. Such multi-tipped diamond tool may also be referred to as a "nano-structured diamond tool." Hence, a micro-structured surface wherein the micro-structures further comprise nano-structures can be concurrently formed during diamond tooling fabrication of the micro-structured tool. Focused ion beam milling processes can be used to form the tips and may also be used to form the valley of the diamond tool. For example, focused ion beam milling can be used to ensure that inner surfaces of the tips meet along a common axis to form a bottom of valley. Focused ion beam milling can be used to form features in the valley, such as concave or convex arc ellipses, parabolas, mathematically defined surface patterns, or random or pseudo-random patterns. A wide variety of other shapes of valley can also be formed. Exemplary diamond turning machines and methods for creating discontinuous, or non-uniform, surface structures can include and utilize a fast tool servo (FTS) as described in, for example, PCT Pub. No. WO 00/48037, published Aug. 17, 2000; U.S. Pat. No. 7,350,442 (Ehnes et al.) and U.S. Pat. No. 7,328,638 (Gardiner et al.); and U.S. Pat. Pub. No. 2009/0147361 (Gardiner et al.).

In some embodiments, the plurality of nano-structures may be formed by shaping the extruded material, or anti-soiling layer, with the micro-replication tool further having a nano-structured granular plating for embossing. Electrodeposition, or more specifically electrochemical deposition, can also be used to generate various surface structures including nano-structures to form a micro-replication tool. The tool may be made using a 2-part electroplating process, wherein a first electroplating procedure may form a first metal layer with a first major surface, and a second electroplating procedure may form a second metal layer on the first metal layer. The second metal layer may have a second major surface with a smaller average roughness than that of the first major surface. The second major surface can function as the structured surface of the tool. A replica of this surface can then be made in a major surface of an optical film to provide light diffusing properties. One example of an electrochemical deposition technique is described in PCT Pub. No. WO 2018/130926 (Derks et al.).

Figure 6:
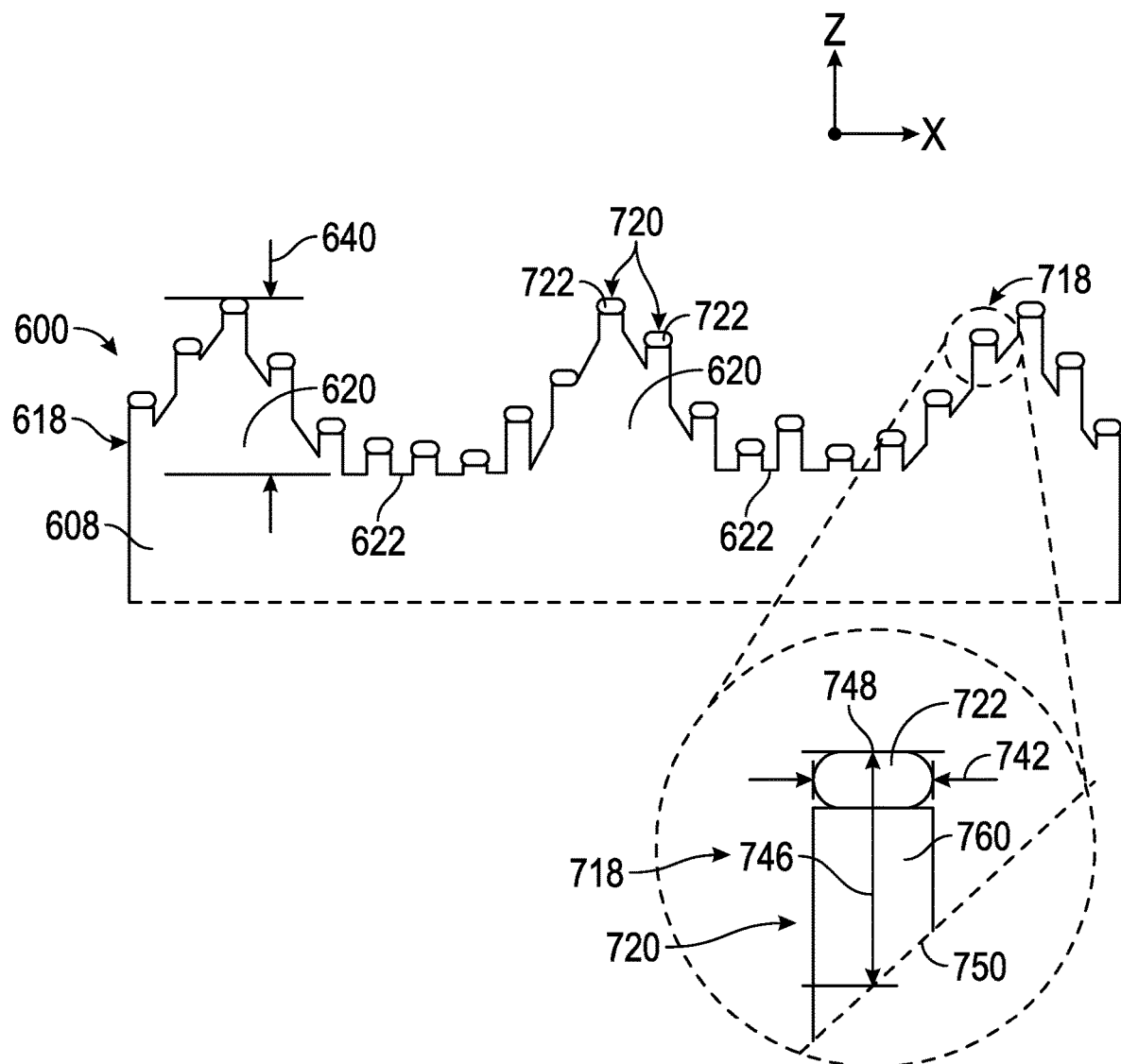
FIG. 6 is a cross-sectional illustration of various nano-structures including masking elements in an xz-plane as an alternative to the nano-structures of FIG. 5 that maybe used with the surface structure of FIGS. 4A-4C.

FIG. 6 shows cross section 600 of antisoiling layer 608 having antisoiling surface 602. Antisoiling surface 602 may be similar to antisoiling surface 402, for example, in that micro-structures 418, 618 of antisoiling layer 408, 608 may have the same or similar dimensions and may also form a skipped tooth riblet pattern of alternating micro-peaks 620 and micro-spaces 622. Antisoiling surface 602 differs from surface 402 in that, for example, nano-structures 720 may include nanosized masking elements 722.

Nano-structures 720 may be formed using masking elements 722. For example, masking elements 722 may be used in a subtractive manufacturing process, such as reactive ion etching (RIE), to form nano-structures 720 of surface 602 having micro-structures 618. A method of making a nano-structure and nano-structured articles may involve depositing a layer to a major surface of a substrate, such as antisoiling layer 408, by plasma chemical vapor deposition from a gaseous mixture while substantially simultaneously etching the surface with a reactive species. The method may include providing a substrate, mixing a first gaseous species capable of depositing a layer onto the substrate when formed into a plasma, with a second gaseous species capable of etching the substrate when formed into a plasma, thereby forming a gaseous mixture. The method may include forming the gaseous mixture into a plasma and exposing a surface of the substrate to the plasma, wherein the surface may be etched, and a layer may be deposited on at least a portion of the etched surface substantially simultaneously, thereby forming the nano-structure.

The substrate can be a (co)polymeric material, an inorganic material, an alloy, a solid solution, or a combination thereof The deposited layer can include the reaction product of plasma chemical vapor deposition using a reactant gas comprising a compound selected from the group consisting of organosilicon compounds, metal alkyl compounds, metal isopropoxide compounds, metal acetylacetonate compounds, metal halide compounds, and combinations thereof Nano-structures of high aspect ratio, and optionally with random dimensions in at least one dimension, and even in three orthogonal dimensions, can be prepared.

In some embodiments of a method of antisoiling layer 608 having a series of micro-structures 618 disposed on antisoiling surface 602 of the layer may be provided. The series of micro-structures 618 may include a series of alternating micro-peaks 620 and micro-spaces 622.

A series of nanosized masking elements 722 may be disposed on at least micro-spaces 622. Antisoiling surface 602 of antisoiling layer 608 may be exposed to reactive ion etching to form plurality of nano-structures 718 on the surface of the layer including series of nano-peaks 720. Each nano-peak 720 may include masking element 722 and column 760 of layer material between masking element 722 and layer 608.

Masking element 722 may be formed of any suitable material more resistant to the effects of RIE than the material of antisoiling layer 608. In some embodiments, masking element 722 includes an inorganic material. Non-limiting examples of inorganic materials include silica and silicon dioxide. In some embodiments, the masking element 722 is hydrophilic. Non-limiting examples of hydrophilic materials include silica and silicon dioxide.

As used herein, the term "maximum diameter" refers to a longest dimension based on a straight line passing through an element having any shape.

Masking elements 722 may be nanosized. Each masking element 722 may define maximum diameter 742. In some embodiments, the maximum diameter of masking element 722 may be at most 1000 (in some embodiments, at most 750, 500, 400, 300, 250, 200, 150, or even at most 100) nanometers. Maximum diameter 742 of each masking element 722 may be described relative to micro-peak height 640 of corresponding micro-peak 620. In some embodiments, corresponding micro-peak height 640 is at least 10 (in some embodiments, at least 25, 50, 100, 200, 250, 300, 400, 500, 750, or even at least 1000) times maximum diameter 742 of masking element 722.

Each nano-peak 720 may define height 722. Height 722 may be defined between baseline 750 and the apex 748 of masking element 722.

Figure 7A:
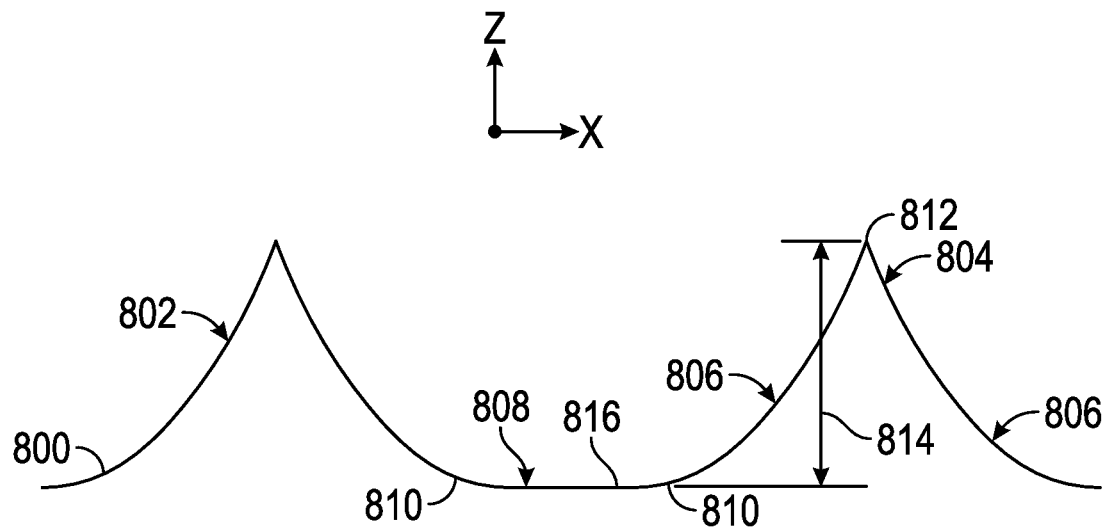
FIGS. 7A and 7B show illustrations of lines representing the cross-sectional profile of different forms of micro-structures for a surface structure in an xz-plane.
Figure 7B:
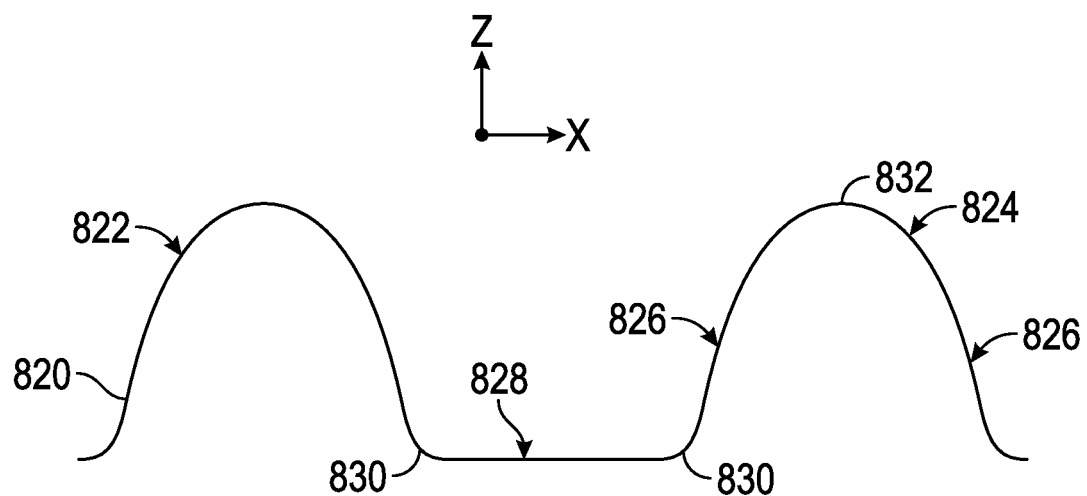

FIGS. 7A and 7B show lines 800 and 820 representing the cross-sectional profile of different forms of peaks 802, 822, which may be micro-peaks of micro-structures or nano-peaks of nano-structures, for any of the antisoiling surfaces, such as surfaces 402, 602. As mentioned, structures do not need to be strictly in the shape of a triangle.

Line 800 shows that first portion 804 (top portion) of peak 802, including apex 812, may have a generally triangular shape, whereas adjacent side portions 806 may be curved. In some embodiments, as illustrated, side portions 806 of peak 802 may not have a sharper turn as it transitions into space 808. Boundary 810 between side portion 806 of peak 802 and space 808 may be defined by a threshold slope of line 800 as discussed herein, for example, with respect to FIGS. 4A-4C and 5.

Space 808 may also be defined in terms of height relative to height 814 of peak 802. Height 814 of peak 802 may be defined between one of boundaries 810 and apex 812. Height of space 808 may be defined between bottom 816, or lowest point of space 808, and one of boundaries 810. In some embodiments, the height of space 808 may be at most 40% (in some embodiments, at most 30%, 25%, 20%, 15%, 10%, 5%, 4%, 3%, or even at most 2%) of height 814 of peak 802. In some embodiments, the height of space 808 is at most 10% (in some embodiments, at most 5%, 4%, 3%, or even at most 2%) of height 814 of peak 802.

Line 820 shows that first portion 824 (top portion) of peak 820, including the apex, may have a generally rounded shape without a sharp turn between adjacent side portions 826. Apex 832 may be defined as the highest point of structure 820, for example, where the slope changes from positive to negative. Although first portion 824 (top portion) may be rounded at apex 832, peak 820 may still define an angle, such as angle A (see FIG. 5), between first and second average slopes.

Boundary 830 between side portion 826 of peak 820 and space 828 may be defined, for example, by a sharper turn. Boundary 830 may also be defined by slope or relative height, as discussed herein.

As shown in FIGS. 8 to 11, the antisoiling surface may be discontinuous, intermittent, or non-uniform. For example, the antisoiling surface may also be described as including micro-pyramids with micro-spaces surrounding the micro-pyramids (see FIGS. 8 and 11).

Figure 8:
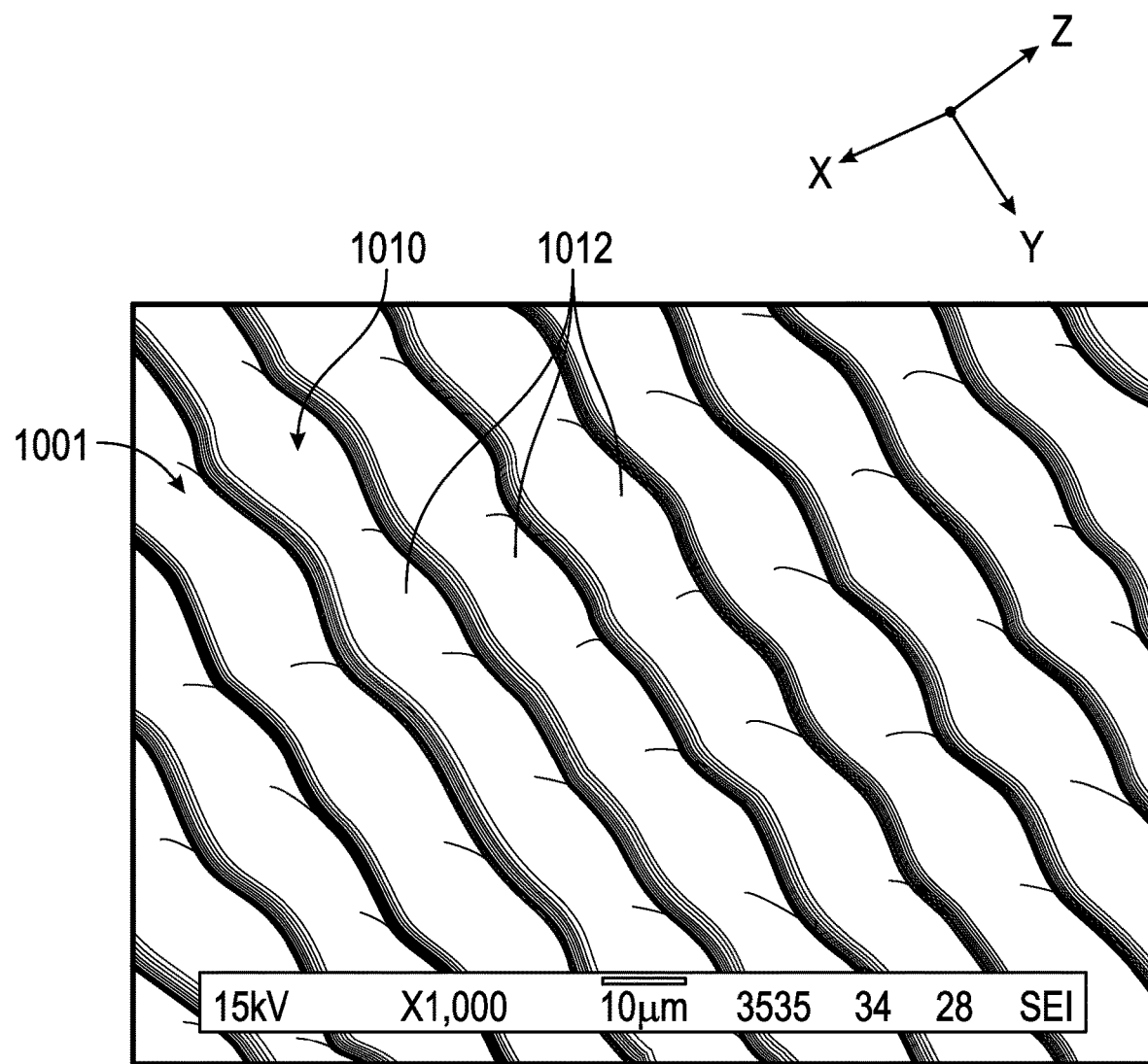
FIG. 8 is a perspective illustration of a portion of a first surface structure with discontinuous micro-structures.

FIG. 8 shows first antisoiling surface 1001 defined at least partially by non-uniform micro-structures 1210. For example, if antisoiling surface 1000 were viewed in the yz-plane (similar to FIG. 4B), at least one micro-peak 1012 may have a non-uniform height from the left side to the right side of the view, which can be contrasted to FIG. 4B showing micro-peak 420 having a uniform height from the left side to the right side of the view. In particular, micro-peaks 1012 defined by the micro-structures 1010 may be non-uniform in at least one of height or shape. The micro-peaks 1012 are spaced by micro-spaces (not shown in this perspective view), similar to other surfaces described herein, such as micro-space 422 of surface 402 (FIGS. 4A and 4C).

Figure 9:
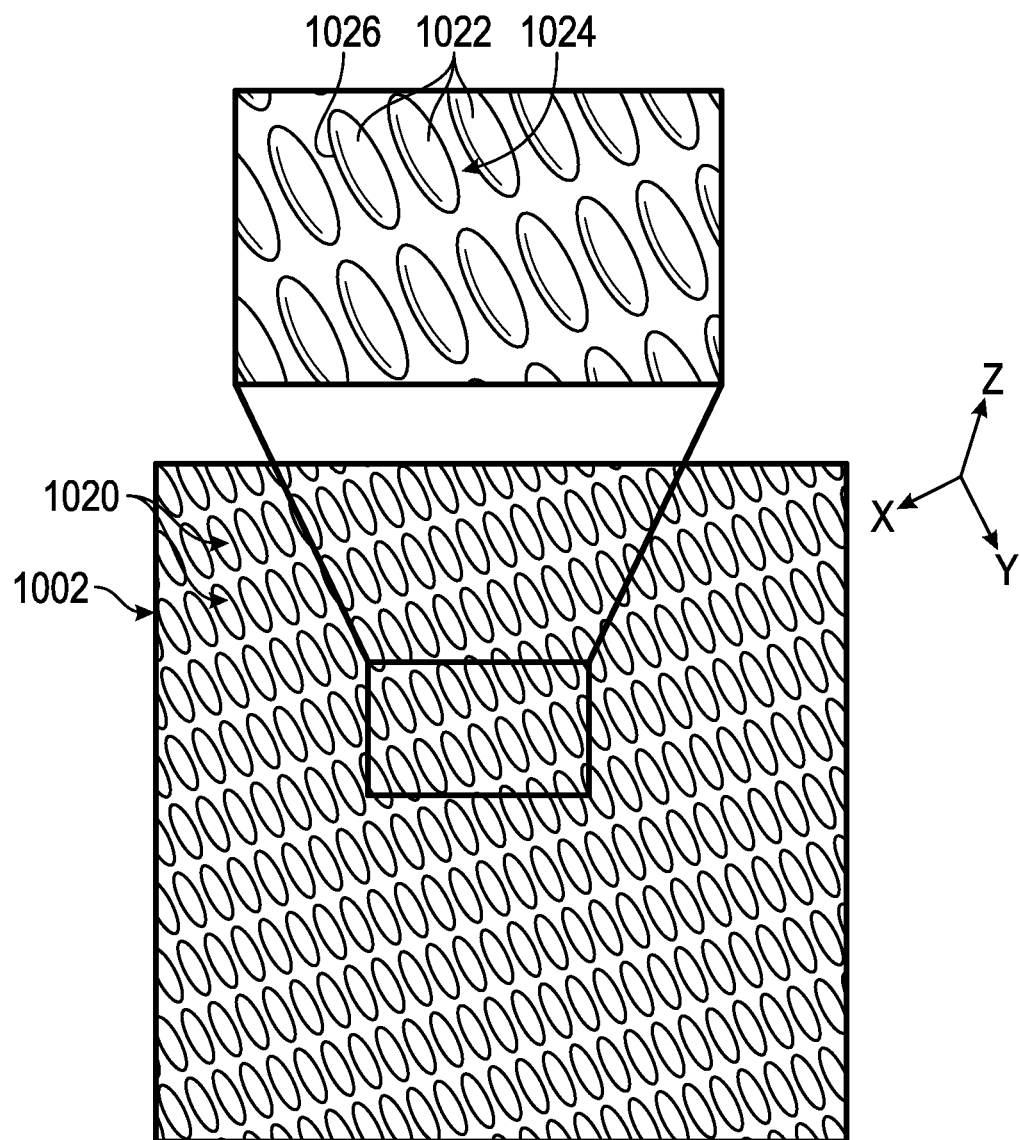
FIG. 9 is a perspective illustration of a portion of a second surface structure with discontinuous micro-structures.

FIG. 9 shows second antisoiling surface 1002 with discontinuous micro-structures 1020. For example, if antisoiling surface 1002 were viewed on the yz-plane (similar to FIG. 4B), more than one nano-peak 1022 may be shown spaced by micro-structures 1020, which can be contrasted to FIG. 4B showing micro-peak 420 extending continuously from the left side to the right side of the view. In particular, micro-peaks 1022 of micro-structures 1020 may be surrounded by micro-spaces 1024. Micro-peaks 1022 may each have a half dome-like shape. For example, the half dome-like shape may be a hemisphere, a half ovoid, a half-prolate spheroid, or a half-oblate spheroid. Edge 1026 of the base of each micro-peak 1022, extending around each micro-peak, may be a rounded shape (e.g., a circle, an oval, or a rounded rectangle). The shape of the micro-peaks 1022 may be uniform, as depicted in the illustrated embodiment, or can be non-uniform.

Figure 10:
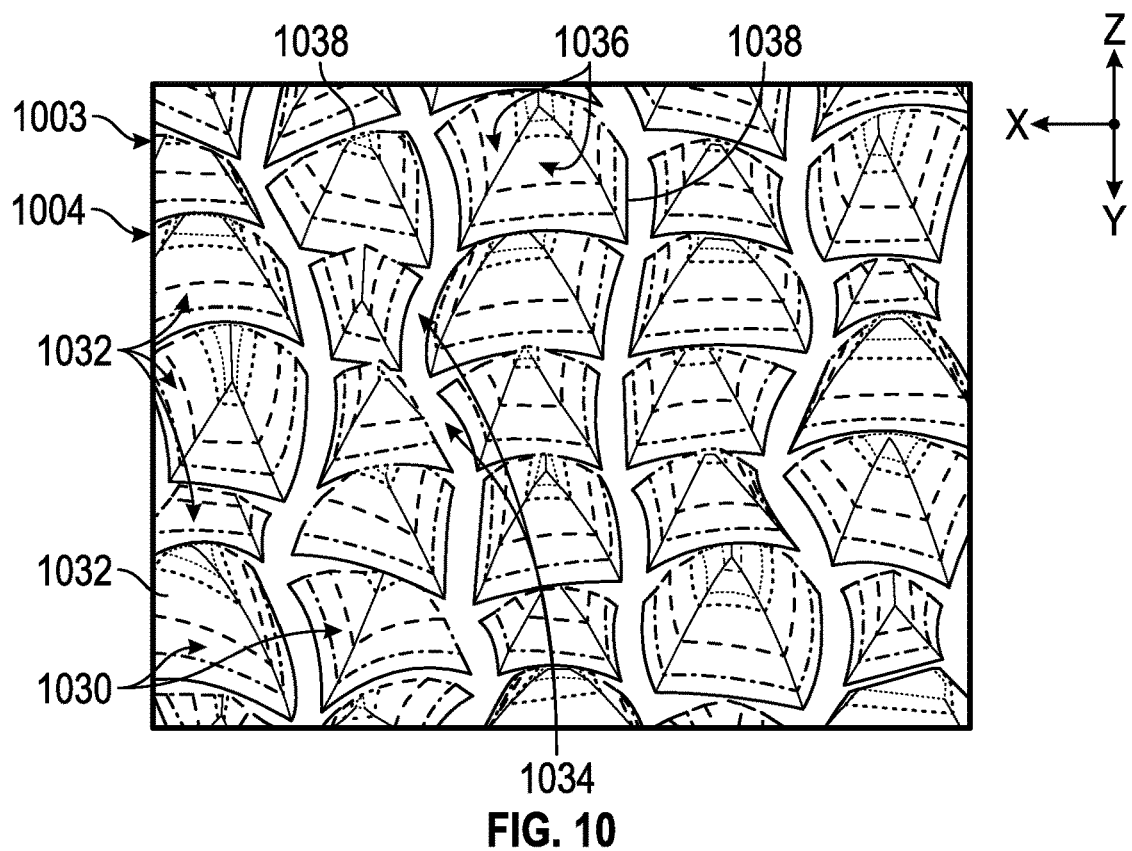
FIGS. 10 and 11 are perspective illustrations of different portions of a third surface structure with discontinuous micro-structures.
Figure 11:
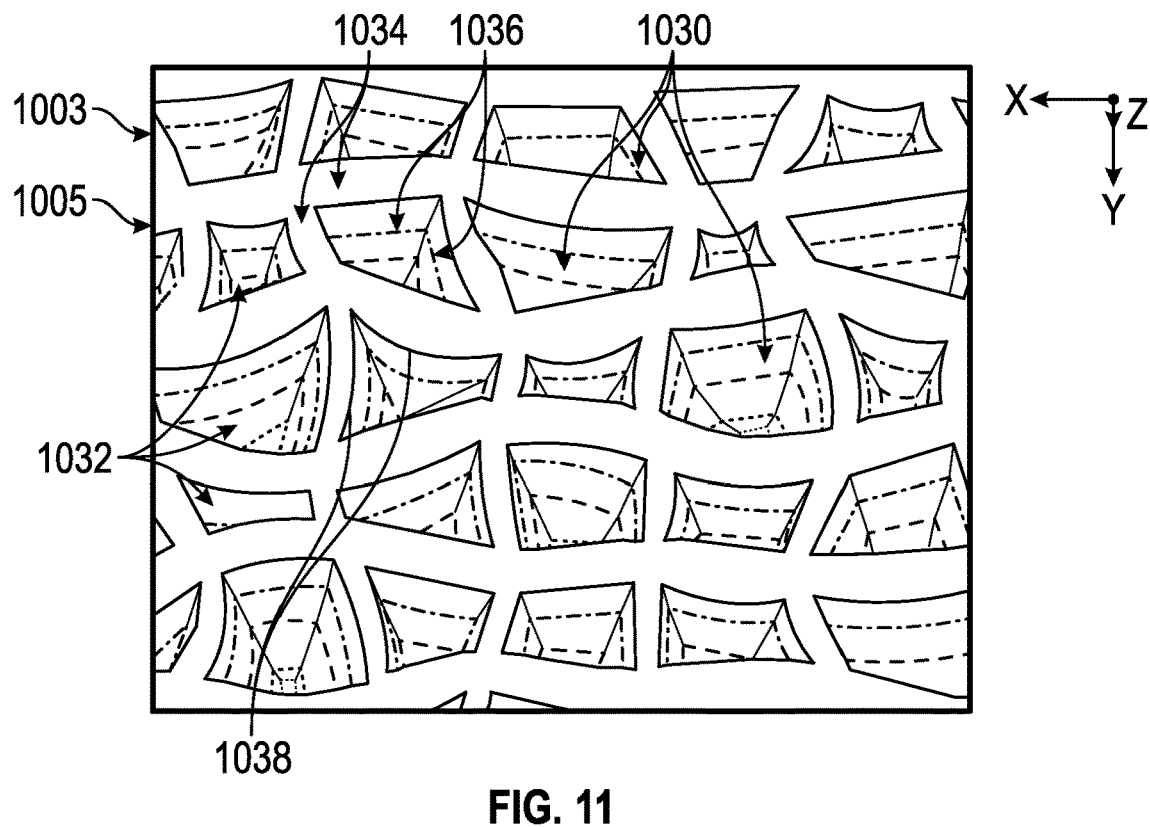

FIGS. 10 and 11 are perspective illustrations of first portion 1004 (FIG. 10) and second portion 1005 (FIG. 11) of third antisoiling surface 1003 with discontinuous micro-structures 1030. Both are perspective views. The FIG. 10 view shows more of a "front" side of the micro-structures 1030 close to a 45-degree angle, whereas the FIG. 11 view shows some of a "back" side of the micro-structures closer to an overhead angle.

Micro-peaks 1032 of micro-structures 1030 surrounded by micro-spaces 1034 may have a pyramid-like shape (e.g., micro-pyramids). For example, the pyramid-like shape may be a rectangular pyramid or a triangular pyramid. Sides 1036 of the pyramid-like shape may be non-uniform in shape or area, as depicted in the illustrated embodiment, or can be uniform in shape or area. Edges 1038 of the pyramid-like shape may be non-linear, as depicted in the illustrated embodiment, or can be linear. The overall volume of each micro-peak 1032 may be non-uniform, as depicted in the illustrated embodiment, or can be uniform.

The above detailed discussions make it clear that if desired, antisoiling surface 31 of antisoiling layer (hardcoat) 30 may be textured, e.g. microstructured and/or nanostructured, to enhance its antisoiling properties. In general, the texturing may be achieved in any suitable manner, whether e.g. achieved by molding or embossing surface 31 against an appropriate tooling surface, or by removal of material from an existing surface 31 e.g. by reactive ion etching, laser ablation, and so on. In some approaches, antisoiling layer 30 may comprise inorganic particles of an appropriate size and/or shape to provide the desired surface texture. In some embodiments, any such particles may be e.g. deposited onto surface 31 and adhered thereto. In other embodiments, any such particles may be incorporated (e.g. admixed) into the material from which layer 30 is to be formed, with layer 30 then being formed in a way that allows the presence of the particles within layer 30 to cause surface 31 to exhibit corresponding texture. In some embodiments the presence of such particles may cause the surface of layer 30 to exhibit texture, in layer 30 as made. In other embodiments, such particles may cause texture to form e.g. upon organic polymeric material being removed from the surface of layer 30 (e.g. by reactive ion etching) while the inorganic particles remain in place, as noted earlier herein. In a variation of such approaches, an inorganic material may be deposited onto a major surface of layer 30 e.g. by plasma deposition, concurrent with an organic material removal (e.g. reactive ion etching) process, to achieve similar affects. Such arrangements are discussed in U.S. Pat. No. 10,134,566.

Any such inorganic particles may comprise e.g. titania, silica, zirconia, barium sulfate, calcium carbonate, or zinc oxide. In some embodiments the inorganic particles may be in the form of nanoparticles including; nanotitania, nanosilica, nanozironia, or even nano-scale zinc oxide particles. In some embodiments the inorganic particles may be in the form of beads or microbeads. The inorganic particles may be formed of a ceramic material, glass, (e.g. borosilicate glass particles available from Potters Industries), or various combinations of thereof. In some embodiments, the inorganic particles may have an effective D90 particle size (as defined in NIST "Particle Size Characterization," ASTM E-2578-07 (2012)) of at least 1 μm, to at most 40 μm.

Potentially suitable inorganic particles include ceramic microspheres available under the trade designations "3M CERAMIC MICROSPHERES WHITE GRADE W-210", "3M CERAMIC MICROSPHERES WHITE GRADE W-410", "3M CERAMIC MICROSPHERES WHITE GRADE W-610" from 3M Company, or various combinations thereof. Potentially suitable inorganic particles also include any of the products available from 3M Company under the trade designation 3M GLASS BUBBLES (K, S, or iM Series). In general, various combinations of inorganic particles of the same or different size may be used.

While a primary purpose of any such texturing (e.g. microstructuring and/or nanostructuring) of outward surface 31 may be to provide enhanced antisoiling, the texturing may provide additional benefits. For example, some textures (depending e.g. on the dimensions of the various structures relative to the wavelength of electromagnetic radiation) may enhance the passive cooling effects achieved by reflective layer 10 and by cooling film 1 as a whole. Furthermore, in instances in which cooling film 1 is applied e.g. to an exterior surface of a vehicle, the texturing may achieve drag reduction. That is, the presence of micro and/or nano structures may result in a lowered coefficient of friction between the surface 31 and the air through which the vehicle is moving, which can result in cost and/or fuel savings.

In some embodiments an antistatic agent or agents may also be incorporated into the antisoiling layer to reduce unwanted attraction of dust, dirt, and debris. Antistatic agents for PMMA and methyl methacrylate copolymer (CoPMMA) optical polymer layers may be provided as STATRITE from Lubrizol Engineered Polymers, Brecksville, Ohio. Additional antistatic agents for PMMA and CoPMMA optical polymer layers may be provided as PELESTAT from Sanyo Chemical Industries, Tokyo, Japan. Optionally, antistatic properties can be provided with transparent conductive coatings, such as: indium tin oxide (ITO), fluorine doped tin oxide (FTO), aluminum doped zinc oxide (AZO), metallic nanowires, carbon nanotubes, or a thin layer of graphene, any of which may be disposed, or coated, onto one of the layers of the antisoiling surface structured films described herein.

As noted, in some embodiments a tie layer 15 may be provided, e.g., to enhance the bonding of a metal layer 10 to an organic polymeric layer 20. Such a tie layer may be of any suitable composition and may be disposed on surface 22 of layer 20 in any suitable manner, whether by solvent coating, application from a liquid dispersion, vapor coating, and so on. In some embodiments, surface 22 may be treated by methods such as plasma treatment, corona treatment, flame treatment, chemical vapor deposition, etc., to enhance the bonding of a metal layer thereto.

Adhesive Layer

As noted earlier, in some embodiments a cooling film 1 may comprise at least one layer 40 of adhesive, e.g. pressure-sensitive adhesive. For example, such an adhesive layer may provide a means of affixing cooling film 1 to a suitable substrate 50. Such an adhesive layer may comprise any adhesive (e.g., thermosetting adhesive, hot melt adhesive, and/or pressure-sensitive adhesive). In some convenient embodiments, such an adhesive layer may be a pressure-sensitive adhesive layer. In some embodiments, the adhesive may be resistant to ultraviolet radiation damage (either inherently, or due to the presence of an added UV-stabilizer). Exemplary adhesives which are typically resistant to ultraviolet radiation damage include silicone adhesives and acrylic adhesives containing UV-stabilizing/absorbing/blocking additive(s). In some embodiments, any such adhesive layer may comprise thermally-conductive particles to aid in heat transfer. Exemplary thermally-conductive particles include aluminum oxide particles, alumina nanoparticles, hexagonal boron nitride particles and agglomerates (e.g., available as 3M BORON DINITRIDE from 3M Company), graphene particles, graphene oxide particles, metal particles, and combinations thereof. An adhesive layer 40 that is to be used to bond cooling film 1 to a substrate 50 may be supplied bearing a release liner on its inward surface (that is, the surface that will be bonded to the substrate after removal of the release liner). A release liner may comprise, for example, a polyolefin film, a fluoropolymer film, a coated PET film, or a siliconized film or paper. (Of course, if cooling film 1 is supplied already bonded to a substrate, no such release liner may be needed other than for processing in the factory.)

If an adhesive layer is to rely on a pressure sensitive adhesive ("PSA"), the pressure sensitive adhesive may be of any suitable composition. PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

One method useful for identifying pressure sensitive adhesives is the Dahlquist criterion. This criterion defines a pressure sensitive adhesive as an adhesive having a 1 second creep compliance of greater than $1\times10^{-6}$ cm$^2$/dyne as described in "Handbook of Pressure Sensitive Adhesive Technology", Donatas Satas (Ed.), $2^{nd}$ Edition, p. 172, Van Nostrand Reinhold, New York, N.Y., 1989, incorporated herein by reference. Alternatively, since modulus is, to a first approximation, the inverse of creep compliance, pressure sensitive adhesives may be defined as adhesives having a storage modulus of less than about $1\times10^6$ dynes/cm$^2$.

PSAs useful for practicing the present disclosure typically do not flow and have sufficient barrier properties to provide slow or minimal infiltration of oxygen and moisture through the adhesive bond line. In at least some embodiments the PSAs disclosed herein are generally transmissive to visible and infrared light such that they do not interfere with passage of visible light. In various embodiments, the PSAs may have an average transmission over the visible portion of the spectrum of at least about 75% (in some embodiments at least about 80, 85, 90, 92, 95, 97, or 98%) measured along the normal axis. In some embodiments, the PSA has an average transmission over a range of 400 nm to 1400 nm of at least about 75% (in some embodiments at least about 80, 85, 90, 92, 95, 97, or 98%). Exemplary PSAs include acrylates, silicones, polyisobutylenes, ureas, and combinations thereof. Some useful commercially available PSAs include UV curable PSAs such as those available from Adhesive Research, Inc., Glen Rock, Pa., under the trade designations "ARclear 90453" and "ARclear 90537" and acrylic optically clear PSAs available, for example, from 3M Company, St. Paul, Minn., under the trade designations "OPTICALLY CLEAR LAMINATING ADHESIVE 8171", "OPTICALLY CLEAR LAMINATING ADHESIVE 8172CL", and "OPTICALLY CLEAR LAMINATING ADHESIVE 8172PCL".

In some embodiments, PSAs useful for practicing the present disclosure have a modulus (tensile modulus) up to 50,000 psi ($3.4\times10^8$ Pa). The tensile modulus can be measured, for example, by a tensile testing instrument such as a testing system available from Instron, Norwood, Mass., under the trade designation "INSTRON 5900". In some embodiments, the tensile modulus of the PSA is up to 40,000, 30,000, 20,000, or 10,000 psi ($2.8\times10^8$ Pa, $2.1\times10^8$ Pa, $1.4\times10^8$ Pa, or $6.9\times10^8$ Pa).

In some embodiments, PSAs useful for practicing the present disclosure are acrylic PSAs. As used herein, the term "acrylic" or "acrylate" includes compounds having at least one of acrylic or methacrylic groups.

In some embodiments, PSAs useful for practicing the present disclosure comprise polyisobutylene. The polyisobutylene may have a polyisobutylene skeleton in the main or a side chain. Useful polyisobutylenes can be prepared, for example, by polymerizing isobutylene alone or in combination with n-butene, isoprene, or butadiene in the presence of a Lewis acid catalyst (for example, aluminum chloride or boron trifluoride).

Useful polyisobutylene materials are commercially available from several manufacturers. Homopolymers are commercially available, for example, under the trade designations "OPPANOL" and "GLISSOPAL" (e.g., OPPANOL B15, B30, B50, B100, B150, and B200 and GLISSOPAL 1000, 1300, and 2300) from BASF Corp. (Florham Park, N.J.); "SDG", "JHY", and "EFROLEN" from United Chemical Products (UCP) of St. Petersburg, Russia.

In some embodiments of PSAs comprising polyisobutylene, the PSA further comprises a hydrogenated hydrocarbon tackifier (in some embodiments, a poly(cyclic olefin)). In some of these embodiments, about 5 to 90 percent by weight the hydrogenated hydrocarbon tackifier (in some embodiments, the poly(cyclic olefin)) is blended with about 10 to 95 percent by weight polyisobutylene, based on the total weight of the PSA composition. Useful polyisobutylene PSAs include adhesive compositions comprising a hydrogenated poly(cyclic olefin) and a polyisobutylene resin such as those disclosed in Int. Pat. App. Pub. No. WO 2007/087281 (Fujita et al.).

Various PSAs that may be suitable are discussed in detail in U.S. Pat. Nos. 9,614,113 and 10,038,112, both of which are incorporated by reference in their entirety herein.

In some embodiments an adhesive layer may be a so-called hot melt adhesive, e.g. that is extruded at a high temperature and, after cooling and solidifying, exhibits PSA properties. Extrudable hot melt adhesives can be formed into pressure sensitive adhesives by, for example, extrusion blending with tackifiers. Exemplary pressure sensitive adhesives are available, for example, under the trade designations "OCA8171" and "OCA8172" from 3M Company, St. Paul, Minn. Extrudable pressure sensitive adhesives are commercially available, for example, from Kuraray, Osaka, Japan, under the trade designations "LIR-290," "LA2330," "LA2250," "LA2140E," and "LA1114;" and Exxon Mobil, Irving, Tex., under the trade designation "ESCORE."

Exemplary extrudable adhesives also include isobutylene/isoprene copolymers available, for example, from Exxon Mobil Corp., under the trade designations "EXXON BUTYL 065," "EXXON BUTYL 068," and "EXXON BUTYL 268"; United Chemical Products, Velizy-Villacoublay, France, under the trade designation "BK-1675N"; LANXESS, Sarnia, Ontario, Canada, under the trade designation "LANXESS BUTYL 301"; "LANXESS BUTYL 101-3", and "LANXESS BUTYL 402"; and Kaneka, Osaka, Japan, under the trade designation "SIBSTAR" (available as both diblocks and triblocks. Exemplary polyisobutylene resins are commercially available, for example, from Exxon Chemical Co., Irving, Tex., under the trade designation "VISTANEX;" Goodrich Corp., Charlotte, N.C., under the trade designation "HYCAR;" and Japan Butyl Co., Ltd., Kanto, Japan, under the trade designation "JSR BUTYL." Various compositions and their use are described in U.S. Patent Application Publication No. 2019-0111666.

Such a PSA layer can be provided by techniques known in the art, such as hot melt extrusion of an extrudable composition comprising the components of the PSA composition. Advantageously, the PSA layer can be made by this process in the absence of solvents. Exemplary methods for making extrudable adhesives are described, for example, in PCT Pub. No. WO1995/016754A1 (Leonard et. al.), the disclosure of which is incorporated herein by reference in its entirety.

UV-Stabilization

In some embodiments, a PSA layer 40 present in cooling film 1 may comprise a UV-blocker. Such terminology broadly encompasses materials commonly referred to as UV-absorbers (UVAs), light stabilizers (e.g. hindered amine light stabilizers) antioxidants, and so on. It will be appreciated that there may not necessarily be a bright-line demarcation between UV-blockers of these various types; for example, some materials may function by more than one of these mechanisms.

Examples of useful UVAs include those available from Ciba Specialty Chemicals Corporation under the trade designations "TINUVIN 328", "TINUVIN 326", "TINUVIN 783", "TINUVIN 770", "TINUVIN 479", "TINUVIN 928", "TINUVIN 1600", and "TINUVIN 1577". Some such UVAs, when used, can be present in an amount e.g. from about 0.01 to 3 percent by weight based on the total weight of the pressure sensitive adhesive composition. Examples of useful UV blockers of the antioxidant type include hindered phenol-based compounds and phosphoric acid ester-based compounds (e.g., those available from Ciba Specialty Chemicals Corporation under the trade designations "IRGANOX 1010", "IRGANOX 1076", and "IRGAFOS 126" and butylated hydroxytoluene (BHT)). Antioxidants, when used, can be present in an amount e.g. from about 0.01 to 2 percent by weight based on the total weight of the pressure sensitive adhesive composition. Examples of useful UV-blockers of the stabilizer type include phenol-based stabilizers, hindered amine-based stabilizers (e.g., those available from BASF under the trade designation "CHIMASSORB" such as "CHIMASSORB 2020"), imidazole-based stabilizers, dithiocarbamate-based stabilizers, phosphorus-based stabilizers, and sulfur ester-based stabilizers. Such compounds, when used, can be present in an amount from about 0.01 to 3 percent by weight based on the total weight of the pressure sensitive adhesive composition.

It will be appreciated that in various embodiments, a PSA layer may be free of UV-blocker or may need only include an amount of UV-blocker adequate to protect the PSA layer itself. For example, a PSA layer 40 that is used to bond cooling film 1 to a substrate 50 as shown in FIG. 1, may not need any UV-blocker. However, since in some circumstances a lateral edge of a PSA layer 40 may be exposed to sunlight, in some embodiments such a PSA layer may advantageously include a sufficient amount of UV-blocking additive to protect the PSA layer.

UV-blocking additives have been mentioned previously herein in the context of incorporating such materials into a hardcoat layer and/or into an adhesive (e.g. a PSA) layer. UV-blocking additives will now be further discussed in general. As noted above, UV-blockers as disclosed herein encompass those compounds known as UV absorbers (UVAs) and those compounds known as UV-stabilizers, in particular Hindered Amine Light Stabilizers (HALS) that can, for example, intervene in the prevention of photo-oxidation degradation of various polymers (for example, PET, PMMA, and CoPMMAs). Exemplary UVAs for incorporation into e.g. PET, PMMA, or CoPMMA include benzophenones, benzotriazoles, and benzotriazines. Commercially available UVAs for incorporation into e.g. PET, PMMA, or CoPMMA include those available as TINUVIN 1577 and TINUVIN 1600 from BASF Corporation, Florham Park, N.J. Another exemplary UV absorber is available, for example, in a polymethylmethacrylate (PMMA) UVA master batch from Sukano Polymers Corporation, Duncan, S.C., under the trade designation "TA11-10 MB03." UVAs may be incorporated in these or any other suitable polymers at a concentration of, for example, 1 to 10 weight percent. Exemplary HALS compounds for incorporation into PET, PMMA, or CoPMMA include those available as CHIMASORB 944 and TINUVIN 123 from BASF Corporation. Another exemplary HALS is available, for example, from BASF Corp., under the trade designation "TINUVIN 944." HALS compounds may be into these or any other polymers at a concentration of, for example, 0.1-1.0 wt. %. A 10:1 ratio of UVA to HALS may be preferred. As noted, in some instances a HALS may synergistically enhance the performance of a UVA. Exemplary anti-oxidants include those available under the trade designations "IRGANOX 1010" and "ULTRANOX 626" from BASF Corporation.

Other UV-blocking additives may be included. For example, small particle non-pigmentary zinc oxide and titanium oxide can be used. Nanoscale particles of zinc oxide, calcium carbonate, and barium sulfate may scatter UV-light (and may be somewhat reflective) while being transparent to visible and near infrared light. Small zinc oxide and barium sulfate particles in the size range of 10-100 nanometers can scatter or reflect UV-radiation are available, for example, from Kobo Products Inc., South Plainfield, N.J. Any such materials are suitable as long as the resulting UV-blocking layer (or layers) meets the criteria established previously herein.

In some embodiments, a UV-absorbing additive may be a red shifted UV absorber (RUVA) that, for example, absorbs at least 70% (in some embodiments, at least 80%, or even at least 90%) of the UV light in the wavelength region from 180 nm to 400 nm. A RUVA may have enhanced spectral coverage in the long-wave UV region (i.e., 300 nm to 400 nm), enabling it to block long-wavelength UV light. Exemplary RUVAs include e.g. 5-trifluoromethyl-2-(2-hydroxy-3-alpha-cumyl-5-tert-octylphenyl)-2H-benzotriazole (available under the trade designation "CGL-0139" from BASF Corporation, Florham, N.J.), benzotriazoles (e.g., 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole), and 2(-4,6-diphenyl-1-3,5-triazin-2-yl)-5-hexyloxy-phenol.

Uses of Cooling Film

Composite cooling films according to the present disclosure can be used to cool an entity with which they are in thermal (e.g., inductive, convective, radiative) communication. Reflectance in the solar region may be particularly effective in facilitating cooling of an entity during the day when subjected to sunlight by reflecting sunlight that would otherwise be absorbed by the entity. Absorption in the aforementioned atmospheric window may be particularly effective in facilitating cooling at night by radiating or emitting infrared light in the previously-mentioned atmospheric window (noting that according to Kirchoff's Law, an item that exhibits high absorption in a particular wavelength range will also exhibit high emissivity in that wavelength range). Energy may also be radiated or emitted during the day to some degree. In some embodiments, the cooling film will absorb a minimum of solar energy from 0.3 to 2.5 micrometers and absorb a maximum of solar energy from 8 to 13 micrometers.

Referring again to FIG. 1, composite cooling film 1 can be secured to a substrate 50 such that composite cooling film 1 is in thermal communication with substrate 50. Composite cooling film 1 may be generally planar in shape; however it does not need to be planar and may be flexible to conform to a nonplanar substrate 50. In some embodiments a substrate 50 may be an item (e.g. a slab of sheet metal) that is secured to any suitable entity 60 (e.g. a vehicle or building). In some embodiments a substrate 50 may be a component of the entity itself (for example, substrate 50 may be a roof or panel of a vehicle, such as e.g. a car or bus). In some embodiments, composite cooling film will be positioned so that it faces at least generally skyward.

In some embodiments, cooling film may form part of a cooling panel that may be disposed on the exterior of at least part of a building or a heat transfer system, for example. The cooling panel and/or heat transfer system can cool a fluid, liquid or gas, which can then be used to remove heat from any desired entity, e.g. a building, a transformer, a broadcast antenna, a server, server farm or data center (e.g., used for cooling a fluid that a server is submerged in), or a vehicle or a component thereof, including an electric vehicle battery. In particular embodiments the cooling panel can remove heat from a heat-rejection component (e.g. condenser) of a cooling/refrigeration/heat pump system. The outer (antisoiling) layer may be suitable for protecting the organic polymeric layer, particularly, in outdoor environments. Including the outer layer may also facilitate less soiling of the surface and ease of cleaning the surface.

In some embodiments, a composite cooling film 1 as disclosed herein may exhibit relatively broadband absorption (and thus emission), e.g. outside of the solar irradiation wavelength of approximately 400-2500 nm. Work herein has indicated that the use of a cooling film 1 that exhibits broadband emission may advantageously enhance the ability of cooling film 1 to passively cool an entity that, in normal operation, is often at a temperature above, e.g. significantly above, the ambient temperature of the surrounding environment. Such entities may include, for example, a heat-rejecting unit (e.g. a heat exchanger, condenser, and/or compressor, and any associated items) of a cooling/refrigeration/heat pump system. Such a heat-rejecting entity may be, for example, an external (e.g. outdoor) unit of a residential cooling or HVAC system or of a commercial or large-scale cooling or HVAC system. Or, such a heat-rejecting entity may be an external unit of a commercial refrigeration or freezer system. In particular embodiments, such an entity may be an external component of a cooling unit of a large refrigerated shipping container such as a truck trailer, rail car, or intermodal container. (Such large-scale refrigerated shipping containers and the like are referred to as "reefers" in the trade.) In some embodiments, such an entity may be a high-voltage transformer, or a high powered broadcast antenna (e.g. such as used in mass-element/beam-forming systems for 5G wireless communication). In any such embodiments, cooling film 1 may exhibit an average absorbance of at least 0.7, 0.8, 0.85, or 0.9, over a wavelength range with a lower limit of e.g. 4, 5, 6 or 7 microns, and/or may exhibit such absorbance over a wavelength that extends to an upper limit of e.g. 14, 16, 18 or 20 microns.

Various uses to which a cooling film may be put are discussed for example in U.S. Provisional Patent Application No. 62/611,639 and in the resulting PCT International Application Publication No. WO 2019/130199; and, in U.S. Patent Application U.S. Provisional Patent Application No. 62/855,392, all of which are incorporated by reference in their entirety herein.

A composite cooling film as disclosed herein may exhibit an average absorbance over the wavelength range 8-13 microns (measured in accordance with procedures outlined in the above-cited '392 US provisional application) of at least 0.85. Among other parameters, the amount of cooling and temperature reduction may depend on the reflective and absorptive properties of composite cooling film 1. The cooling effect of composite cooling film 1 may be described with reference to a first temperature of the ambient air proximate or adjacent to the substrate and a second temperature of the portion of substrate 50 proximate or adjacent to composite cooling film 1. In some embodiments, the first temperature is greater than the second temperature by at least 2.7 (in some embodiments, at least 5.5, 8.3, or even at least 11.1) degrees Celsius (e.g., at least 5, 10, 15, or even at least 20 degrees Fahrenheit).

In various embodiments, a composite cooling film as disclosed herein may exhibit an average reflectance of electromagnetic radiation of at least 85, 90, or 95% over a wavelength range from 400 to 2500 nanometers. As noted earlier, in some embodiments this may be an average value obtained by weighting the results over this wavelength range according to the weightings of the AM1.5 standard solar spectrum, which provides an indication of the ability of the cooling film to reflect solar irradiation.

It will be apparent to those skilled in the art that the specific exemplary embodiments, elements, structures, features, details, arrangements, configurations, etc., that are disclosed herein can be modified and/or combined in numerous ways. It is emphasized that any embodiment disclosed herein may be used in combination with any other embodiment or embodiments disclosed herein, as long as the embodiments are compatible. For example, any herein-described arrangement of a various layers of a cooling film may be used in combination with any herein-described compositional feature of any such layer, as long as such features and arrangements result in a compatible combination. Similarly, the methods disclosed herein may be used with a cooling film comprising any of the arrangements, compositional features, and so on, disclosed herein. While a limited number of exemplary combinations are presented herein, it is emphasized that all such combinations are envisioned and are only prohibited in the specific instance of a combination that is incompatible.

In summary, numerous variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A composite cooling film comprising:
a non-fluorinated organic polymeric layer having an absorbance of at least 0.80 in a wavelength range of from 8 to 13 microns;
a metal layer that is disposed inwardly of the non-fluorinated organic polymeric layer,
wherein the non-fluorinated organic polymeric layer and the metal layer collectively exhibit an average reflectance of electromagnetic radiation of at least 85% over a wavelength range from 400 to 2500 nanometers;
and,
an antisoiling, ultraviolet-absorbing hardcoat layer of organic polymeric material, the antisoiling, ultraviolet-absorbing hardcoat layer being disposed outwardly of the non-fluorinated organic polymeric layer and comprising an outwardly-facing, exposed antisoiling surface,
wherein the composite cooling film has an average absorbance over the wavelength range 8-13 microns of at least 0.85.

2. The composite cooling film of claim 1 wherein the non-fluorinated organic polymeric layer is a microporous layer comprising an average reflectance of electromagnetic radiation of at least 50% over a wavelength range from 400 to 2500 nanometers.

3. The composite cooling film of claim 1 wherein the non-fluorinated organic polymeric layer is a nonporous layer comprising an average reflectance of electromagnetic radiation of less than 15% over a wavelength range from 400 to 2500 nanometers.

4. The composite cooling film of claim 1 wherein the metal layer comprises an average reflectance of electromagnetic radiation of at least 85% over a wavelength range from 400 to 2500 nanometers.

5. The composite cooling film of claim 1 wherein the non-fluorinated organic polymeric layer has an absorbance of at least 0.9 in a wavelength range of from 8 to 13 microns.

6. The composite cooling film of claim 1 wherein the composite cooling film further comprises a layer of pressure-sensitive adhesive that is disposed inwardly of the reflective metal layer and that is disposed inwardly of a corrosion protection layer, if present.

7. The composite cooling film of claim 1 wherein the antisoiling, ultraviolet-absorbing hardcoat layer is loaded with at least one UV-blocking additive.

8. The composite cooling film of claim 1, wherein the antisoiling, ultraviolet-absorbing hardcoat layer is an acrylate-based hardcoat layer.

9. The composite cooling film of claim 1 wherein the metal layer comprises a layer of vapor-coated metal that is in direct contact with an inwardly-facing surface of the antisoiling, ultraviolet-absorbing hardcoat layer.

10. The composite cooling film of claim 1 wherein the reflective metal layer comprises metal chosen from the group consisting of silver, aluminum, gold and copper, and alloys and blends thereof.

11. The composite cooling film of claim 1 wherein the composite cooling film further comprises a corrosion-protection layer disposed inward of the reflective metal layer, wherein the corrosion-protection layer is copper, silicon dioxide, or aluminum silicate.

12. The composite cooling film of claim 1 wherein the reflective metal layer is silver, a silver/gold blend, or a silver/copper blend.

13. The composite cooling film of claim 1 wherein the non-fluorinated organic polymeric layer is a nonporous polyester film comprising an average reflectance of electromagnetic radiation of less than 15% over a wavelength range from 400 to 2500 nanometers and having an absorbance of at least 0.80 in a wavelength range of from 8 to 13 microns; wherein the metal layer is a layer of silver or aluminum comprising an average reflectance of electromagnetic radiation of at least 85% over a wavelength range from 400 to 2500 nanometers; wherein the antisoiling, ultraviolet-absorbing layer of organic polymeric material is an organic polymeric hardcoat that is loaded with at least one UV-blocking additive, and wherein the outwardly-facing, exposed antisoiling surface of the antisoiling layer exhibits surface texture in the form of micro-structures and/or nano-structures.

14. The composite cooling film of claim 1 wherein the outwardly-facing, exposed antisoiling surface of the antisoiling layer is a textured surface comprising micro-structures and/or nano-structures.

15. The composite cooling film of claim 14, wherein the outwardly-facing, exposed antisoiling surface of the antisoiling layer extends along an axis, and wherein a plane containing the axis defines a cross-section of the antisoiling layer and intersects the surface to define a line describing the surface in two dimensions, the layer comprising:
a series of micro-structures at least partially defined by the line, the line defining a series of alternating micro-peaks and micro-spaces along the axis, wherein each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees; and
a plurality of nano-structures at least partially defined by the line, the line defining at least one series of nano-peaks disposed on at least the micro-spaces along the axis,
wherein each nano-peak has a height and each corresponding micro-peak has a height of at least 10 times the height of the nano-peak.

16. The composite cooling film of claim 15, wherein the micro-peak first average slope is positive, and the micro-peak second average slope is negative.

17. The composite cooling film of claim 15, wherein a width of each micro-space is at least one of: at least 10% of a corresponding micro-peak distance or at least 10 micrometers.

18. The composite cooling film of claim 15, wherein a micro-peak distance between micro-peaks is in a range from 1 micrometer to 1000 micrometers.

19. The composite cooling film of claim 15, wherein the micro-peaks have a height of at least 10 micrometers.

20. The composite cooling film of claim 15, wherein each nano-peak comprises a first nano-segment defining a first average slope and a second nano-segment defining a second average slope, wherein an angle formed between the nano-peak first average slope and the nano-peak second average slope is at most 120 degrees.

21. The composite cooling film of claim 15, wherein the plurality of nano-structures is further disposed on the micro-peaks.

22. The composite cooling film of claim 14, wherein at least some of the micro-structures and/or nano-structures are provided by inorganic particles present on the outwardly-facing, exposed antisoiling surface.

23. A composite cooling film comprising:
 a non-fluorinated organic polymeric layer having an absorbance of at least 0.80 in a wavelength range of from 8 to 13 microns;
 a metal layer that is disposed inwardly of the non-fluorinated organic polymeric layer,
  wherein the non-fluorinated organic polymeric layer and the metal layer collectively exhibit an average reflectance of electromagnetic radiation of at least 85% over a wavelength range from 400 to 2500 nanometers;
 and,
 an antisoiling, ultraviolet-absorbing hardcoat layer of organic polymeric material, the antisoiling layer being disposed outwardly of the non-fluorinated organic polymeric layer and comprising an outwardly-facing, exposed antisoiling surface;
  wherein the composite cooling film has an average absorbance over the wavelength range 4-20 microns of at least 0.85.

24. An assembly comprising a composite cooling film of claim 1 secured to an exterior surface of a substrate so that the antisoiling surface of the antisoiling layer is outward-facing and exposed and so that the composite cooling film and the substrate are in thermal communication with each other.

25. The assembly of claim 24 wherein the composite cooling film is secured to the exterior surface of the substrate via a pressure-sensitive adhesive that is loaded with a UV-blocking additive.

26. A method of passively cooling a substrate, the method comprising securing a composite cooling film of claim 1 to an exterior surface of the substrate so that the antisoiling surface of the antisoiling layer is outward-facing and exposed, so that the composite cooling film and the substrate are in thermal communication with each other, and so that the substrate with the composite cooling film secured thereon is positioned so that it faces at least generally skyward.

* * * * *